(12) United States Patent
Kang et al.

(10) Patent No.: US 11,641,455 B2
(45) Date of Patent: May 2, 2023

(54) METHOD AND APPARATUS FOR MEASURING DYNAMIC CROSSTALK

(71) Applicant: SAMSUNG ELECTRONICS CO., LTD., Suwon-si (KR)

(72) Inventors: Byong Min Kang, Yongin-si (KR); Chansol Hwang, Suwon-si (KR); Jinho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 17/200,236

(22) Filed: Mar. 12, 2021

(65) Prior Publication Data

US 2022/0109815 A1 Apr. 7, 2022

(30) Foreign Application Priority Data

Oct. 6, 2020 (KR) .................. 10-2020-0129030

(51) Int. Cl.
*H04N 13/125* (2018.01)
*H04N 13/383* (2018.01)
*H04N 17/04* (2006.01)
*H04N 13/302* (2018.01)
*H04N 13/324* (2018.01)
(Continued)

(52) U.S. Cl.
CPC ......... *H04N 13/125* (2018.05); *G06T 7/0002* (2013.01); *H04N 13/221* (2018.05); *H04N 13/302* (2018.05); *H04N 13/324* (2018.05); *H04N 13/383* (2018.05); *H04N 17/04* (2013.01); *G06T 2207/10012* (2013.01); *G06T 2207/30168* (2013.01); *G06T 2207/30204* (2013.01); *H04N 2013/0074* (2013.01)

(58) Field of Classification Search
USPC .......................................................... 348/50
See application file for complete search history.

(56) References Cited

U.S. PATENT DOCUMENTS 8,704,880 B2   4/2014   Lim et al.
2012/0105611 A1*  5/2012  Godar .................. H04N 13/366
                                                       348/54
(Continued)

FOREIGN PATENT DOCUMENTS

CN   108195563 B   4/2020
KR   10-1198557 B1   11/2012
(Continued)

OTHER PUBLICATIONS

Communication dated Feb. 4, 2022 issued by the European Patent Office in application No. 21189096.7.
(Continued)

*Primary Examiner* — Mikhail Itskovich
(74) *Attorney, Agent, or Firm* — Sughrue Mion, PLLC

(57) ABSTRACT

A method and apparatus for measuring a dynamic crosstalk are provided. The method may include: controlling a driver configured to cause a camera to have a dynamic movement; at either one or both of a left eye position and a right eye position of a user, capturing a stereo pattern image output through a three-dimensional (3D) display, by the camera while the camera is in the dynamic movement; and measuring the dynamic crosstalk occurring by the 3D display based on the stereo pattern image captured by the camera.

31 Claims, 12 Drawing Sheets

(51) Int. Cl.
*H04N 13/221* (2018.01)
*G06T 7/00* (2017.01)
*H04N 13/00* (2018.01)

(56) References Cited

U.S. PATENT DOCUMENTS

2012/0262556 A1 10/2012 Kuwahara et al.
2019/0149808 A1* 5/2019 Ng .................... H04N 13/327
                                                                          348/59

FOREIGN PATENT DOCUMENTS

KR 10-2014-0092055 A 7/2014
KR 10-2016-0079555 A 7/2016
KR 10-2121389 B1 6/2020

OTHER PUBLICATIONS

Atanas Boev et al., "Crosstalk Measurement Methodology for Auto-Stereoscopic Screens", 3DTV Conference, IEEE Xplore, DOI: 10.1109/3DTV.2007.4379396, Jun. 2007, 5 pages total.

* cited by examiner

Constant velocity of 20mm/sec

Constant velocity of 260mm/sec

METHOD AND APPARATUS FOR MEASURING DYNAMIC CROSSTALK

CROSS-REFERENCE TO RELATED APPLICATION

This application claims priority from Korean Patent Application No. 10-2020-0129030 filed on Oct. 6, 2020, in the Korean Intellectual Property Office, the disclosure of which is incorporated herein by reference in its entirety.

BACKGROUND

1. Field

Methods and apparatuses consistent with example embodiments relate to measuring a dynamic crosstalk.

2. Description of Related Art

For a stereo method that provides a three-dimensional (3D) effect through radiation of an image to each of binocular viewpoints, a crosstalk may occur when a position of an eye of a user is erroneously tracked or an image is generated differently from a predetermined manufacturing value of an optical layer such as a lenticular lens. For example, when a crosstalk occurs in a glassless 3D display, a user may not experience a 3D stereo effect, but awkwardness or dizziness. To prevent such a crosstalk, various methods are employed. However, such methods are conceived under the assumption that the position of the eyes of a user is fixed, and thus the methods are not applicable when the eyes of a user move.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide an apparatus and a method for measuring a crosstalk that occurs in a 3D display by using a camera that simulates the dynamic movement of the user's eyes, and generating an image in which the crosstalk is reduced or removed.

According to an aspect of an example embodiment, there is provided a method of measuring a dynamic crosstalk, including: controlling a driver configured to cause a camera to have a dynamic movement; at either one or both of a left eye position and a right eye position of a user, capturing a stereo pattern image output through a three-dimensional (3D) display, by the camera while the camera is in the dynamic movement; and measuring the dynamic crosstalk occurring by the 3D display based on the stereo pattern image captured by the camera.

The measuring of the dynamic crosstalk may include: detecting a plurality of markers that indicate a plurality of regions of the captured stereo pattern image corresponding to a maximum brightness and a minimum brightness in the captured stereo pattern image; extracting the plurality of regions based on the plurality of markers; and measuring the dynamic crosstalk based on a brightness value of pixels measured from each of the plurality of regions.

The measuring of the dynamic crosstalk may include: calculating an average of the dynamic crosstalk based on a velocity of the dynamic movement.

When the camera captures, as the stereo pattern image, a left image to be provided to a left eye of the user and a right image to be provided to a right eye of the user, the measuring of the dynamic crosstalk may include: detecting a plurality of markers that divides each of the left image and the right image into a plurality of regions; extracting the plurality of regions based on the plurality of markers; and measuring the dynamic crosstalk based on a statistical value of a brightness value of pixels measured from each of the plurality of regions.

The controlling of the driver may include: controlling the driver to cause the camera to move at a constant velocity and in a variable direction.

The controlling of the driver may include at least one of: controlling the driver to cause the camera to move in a direction and at a velocity that simulate a movement of the user; or adjusting a pupillary distance of a face mask arranged in a direction facing the 3D display.

A position of the camera may correspond to a position of at least one eye in a face mask arranged in a direction facing the 3D display.

The method may further include: capturing, at either one or both of the left eye position and the right eye position of the user, the stereo pattern image based on a pupillary distance of a face mask arranged in a direction facing the 3D display.

The capturing of the stereo pattern image may include: capturing the stereo pattern image in an interval while the camera moves at a constant velocity, and the measuring of the dynamic crosstalk may include: measuring the dynamic crosstalk by analyzing stereo pattern image captured in the interval while the camera moves at the constant velocity.

The method may further include: compensating for the dynamic crosstalk based on a position of the camera moved by the dynamic movement.

The stereo pattern image captured by the camera may include a first region corresponding to a first pattern image for measuring a maximum brightness, a second region corresponding to a second pattern image for measuring a minimum brightness, and a third region corresponding to a third pattern image for measuring a brightness offset of the 3D display.

The 3D display may be configured to generate the stereo pattern image comprising a face model that match the left eye position and the right eye position of the user, based on parameters of an optical layer obtained through 3D calibration.

The 3D display may include: an eye tracker or a sensor configured to detect the left eye position and the right eye position of the user, wherein the 3D display may be configured to apply rendering to positions of the stereo pattern image corresponding to the left eye position and the right eye position of the user.

The 3D display may include at least one of a head-up display (HUD), a 3D digital information display (DID), a navigation device, a 3D mobile device, a smartphone, a smart television (TV), a smart vehicle, an Internet of things (IoT) device, a medical device, or a measurement device.

The stereo pattern image may include a two-dimensional (2D) pattern that represents a pattern of a single color identically to a left eye and a right eye of the user, and a 3D pattern that represents patterns of contrasting colors inversely to the left eye and the right eye of the user.

The stereo pattern image may include a 2D pattern that represents patterns of contrasting colors identically to a left eye and a right eye of the user, and a 3D pattern that represents the patterns of the contrasting colors inversely to the left eye and the right eye of the user.

According to an aspect of an example embodiment, there is provided a non-transitory computer-readable storage medium storing instructions that are executable by a processor to perform the method of measuring the dynamic crosstalk.

According to an aspect of an example embodiment, there is provided an apparatus for measuring a dynamic crosstalk, including: a face mask in which a left eye position and a right eye position of the face mask correspond to a left eye position and a right eye position of a user, respectively; a camera configured to capture, at either one or both of the left eye position and the right eye position in the face mask, a stereo pattern image that is output through a three-dimensional (3D) display; a driver configured to cause the camera to have a dynamic movement; and a processor configured to measure the dynamic crosstalk occurring by the 3D display based on the stereo pattern captured by the camera while the camera is in the dynamic movement.

The processor may be further configured to: detect a plurality of markers that indicate a plurality of regions of the captured stereo pattern image corresponding to a maximum brightness and a minimum brightness in the captured stereo pattern image; extract the plurality of regions based on the plurality of markers; and measure the dynamic crosstalk based on a brightness value of pixels measured from each of the plurality of regions.

When the camera captures, as the stereo pattern image, a left image to be provided to a left eye of the user and a right image to be provided to a right eye of the user, the processor may be further configured to: detect a plurality of markers that divides each of the left image and the right image into a plurality of regions; extract the plurality of regions based on the plurality of markers; and measure the dynamic crosstalk based on a statistical value of a brightness value of pixels measured from each of the plurality of regions.

The processor may be further configured to: compensate for the dynamic crosstalk based on a position of the camera moved by the dynamic movement.

The captured stereo pattern image may include a first region corresponding to a first pattern image for measuring a maximum brightness, a second region corresponding to a second pattern image for measuring a minimum brightness, and a third region corresponding to a third pattern image for measuring a brightness offset of the 3D display.

The driver may include: a motor configured to provide power for causing the camera to have the dynamic movement; and a camera mover configured to move the camera by the power in a direction and at a velocity to simulate a movement of the user.

The processor may be further configured to: control the camera mover to move the camera at the velocity having a constant value.

The processor may be further configured to: control the camera mover to change at least one of the direction or the velocity of the camera.

A distance between the left eye position and the right eye position in the face mask may be adjustable, and the processor is configured to: measure the dynamic crosstalk by extracting a plurality of regions from the captured stereo pattern image based on the dynamic movement and the distance between the left eye position and the right eye position that is adjusted in the face mask.

The 3D display may be configured to: generate the stereo pattern image that match the left eye position and the right eye position of the user, based on parameters of an optical layer obtained through 3D calibration.

The apparatus may further include: an eye tracker or a sensor configured to detect the left eye position and the right eye position of the user, wherein the 3D display may be configured to: apply rendering to positions of the stereo pattern image that correspond to the left eye position and the right eye position of the user that are detected using the eye tracker or the sensor.

The stereo pattern image may include a two-dimensional (2D) pattern that represents a pattern of a single color identically to a left eye and a right eye of the user, and a 3D pattern that represents patterns of contrasting colors inversely to the left eye and the right eye of the user.

The stereo pattern image may include a 2D pattern that represents patterns of contrasting colors identically to a left eye and a right eye of the user, and a 3D pattern that represents the patterns of the contrasting colors inversely to the left eye and the right eye of the user.

The 3D display may include at least one of a head-up display (HUD), a 3D digital information display (DID), a navigation device, a 3D mobile device, a smartphone, a smart television (TV), a smart vehicle, an Internet of things (IoT) device, a medical device, or a measurement device.

According to an aspect of an example embodiment, there is provided a crosstalk testing apparatus including: at least one camera configured to capture, at either one or both of a left eye position and a right eye position of a user, a stereo pattern image output through a head-up display (HUD); a driver configured to cause the camera to have a dynamic movement; and a processor configured to measure a dynamic crosstalk occurring by the HUD based on the stereo pattern image captured by the camera while the camera is in the dynamic movement.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
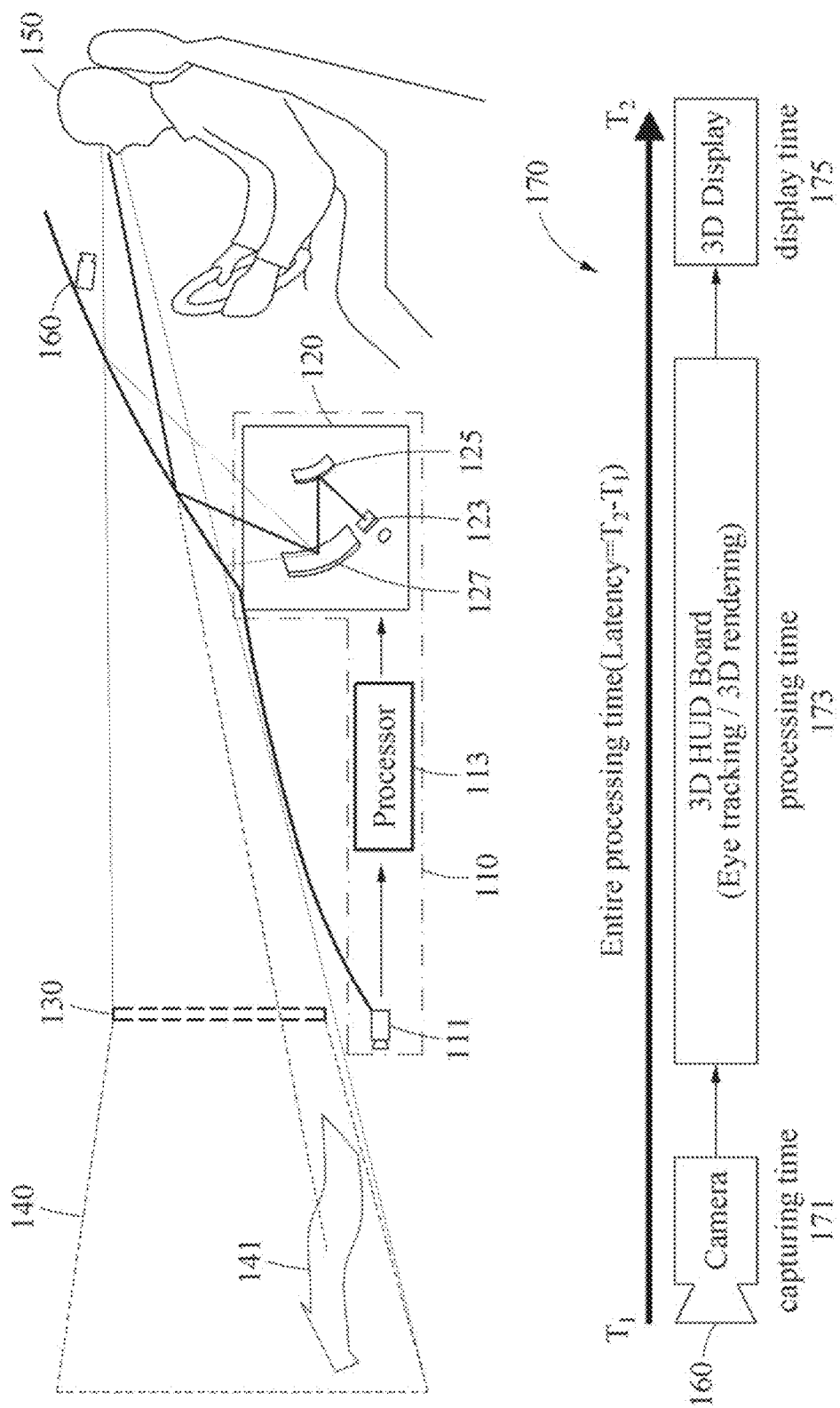
FIG. 1 illustrates an example of a situation in which a dynamic crosstalk occurs according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a situation in which a dynamic crosstalk occurs according to an example embodiment. A crosstalk described herein will be shortly referred to as an X-talk. Referring to FIG. 1, a user (e.g., a driver) 150 sitting on a driver's seat of a vehicle may receive a three-dimensional (3D) content object through a content visualizing device 110. The content visualizing device 110 refers to a system configured to provide the user 150 with a virtual content object 141 and includes a sensor 111, a processor 113, a head-up display (HUD) module 120, and an eye tracking camera 160 configured to track positions of both eyes of the user 150.

The sensor 111 may detect an object present in front. For example, the sensor 111 may measure a distance to the object present in front. However, examples are not limited to the foregoing example. The sensor 111 may measure a distance to an object present around the vehicle and generate a distance map indicating the distance to the object present nearby. In addition, the sensor 111 may capture and generate an image of an environment each on a front side, a rear side, a left side, and a right side of the vehicle. The sensor 111 may include a module configured to measure and estimate a position of the content visualizing device 110, such as, for example, a global navigation satellite system (GNSS), or a 3D depth camera.

The processor 113 may obtain the virtual content object 141 that contains information is to be provided to the user 150. The processor 113 may analyze surrounding information (e.g., an image including a nearby object and a distance to the object) sensed by the sensor 111 to model an object, detect a position of an object, recognize an object, or the like. The processor 113 may select and load the virtual content object 141 to be provided to the user 150 based on a current position and an object arranged space that is based on a viewing angle of the HUD module 120.

The HUD module 120 may visualize the virtual content object 141 in a visible region 140 of the user 150 that is in front of the user 150. The HUD module 120 may include three primary components: a picture generation unit (PGU) 123 configured to generate and/or process data for projection; a projection unit (e.g., a fold mirror 125 and a concave mirror 127) configured to generate and direct an image; and a combiner (e.g., a windscreen of the vehicle) that provides a surface where the image is projected, but embodiments of the present disclosure are not limited thereto and may include more or less number of components. The PGU 123 may be provided separately from the processor 113, or may be integrated into the processor 113.

In detail, the HUD module 120 may visualize the virtual content object 141 on a glass window in front of the user 150, for example, a windshield glass of the vehicle. The HUD module 120 may form a virtual projection plane 130. The virtual projection plane 130 refers to a plane on which a virtual image including the virtual content object 141 generated by the HUD module 120 is displayed. The user 150 may recognize that the virtual image is formed on the projection plane 130. The projection plane 130 may be formed in an observable region that may be observed by the eyes of the user 150.

In addition, the HUD module 120 may visualize, on the projection plane 130, the virtual content object 141 having a corresponding depth in the visible region 140. The virtual content object 141 may be rendered by 3D graphic representation by the processor 113 based on an optical system of the HUD module 120.

The fold mirror 125 and the concave mirror 127 may direct and project an image onto the virtual projection plane 130. However, a configuration of the HUD module 120 is not limited to the foregoing, and may include various components that form the projection plane 130 on which the virtual image is formed through projection to the glass window present in front of the user 150 according to a design. According to some examples, the HUD module 120 may further include the eye tracking camera 160 configured to track the positions of the eyes of the user 150.

The HUD module 120 may form the projection plane 130 to which a left image for a left eye of the user 150 and a right image for a right eye of the user 150 are output based on the depth of the virtual content object 141, and provide the left image to the left eye of the user 150 and the right image to the right eye of the user 150 through the projection plane 130. Thus, the user 150 may recognize a sense of the depth of the virtual content object 141 that is rendered in a stereoscopic manner or three-dimensionally.

In a case in which the right image for the right eye is provided to the left eye of the user 150 and the left image for the left eye is provided to the right eye of the user 150 in a 3D display such as the HUD module 120, an X-talk may occur. The X-talk may be defined as a degree by which the right image is visible to the left eye of the user 150 or a degree by which the left image is visible to the right eye of the user 150.

The X-talk may be classified into a static X-talk and a dynamic X-talk based on whether a position of an eye of the user 150 is fixed during measurement. A position of an eye will be interchangeably described as an eye position hereinafter.

The static X-talk may be one that is measured when an eye position of the user 150 is fixed. During measurement of the static X-talk, by changing a position of a camera and capturing images with different brightness, an issue in image registration (or matching) may arise. Thus, the static X-talk may be quantified when the user 150 remains at rest.

However, in many actual cases, the user 150 may be in motion without being at rest, and thus an eye position of the user 150 may continuously change. The dynamic X-talk may be one that is measured when an eye position of the user 150 moves. For example, the dynamic X-talk may occur in the following situations.

For example, the user 150 (or a driver) who drives the vehicle may move differently every moment and may thus recognize differently a 3D image quality of the virtual content object 141 provided through the HUD module 120. The dynamic X-talk may occur due to such a movement of the user 150 during the driving.

For another example, an entire processing time used for the content visualizing device 110 to display, on a 3D display, the virtual content object 141 that is three-dimensionally rendered at a tracked eye position after tracking an eye position of the user 150 may be $T_2-T_1$. In this example, the entire processing time $T_2-T_1$ may include a capturing time 171 used for the eye tracking camera 160 to track the eye position of the user 150, a processing time 173 used to perform 3D rendering on the virtual content object 141 based on the tracked eye position of the user 150, and a display time 175 used to display the virtual content object 141 that is three-dimensionally rendered on the 3D display.

In this example, the entire processing time $T_2-T_1$ may correspond to a latency of the content visualizing device 110. In addition, there may be a certain distance between an eye position of the user 150 at a time $T_1$ and an eye position of the user 150 at a time $T_2$. A result of the 3D rendering based on the time $T_1$ may be displayed at a position that is not far away from the eye position of the user 150 at the time $T_1$, or displayed at a position that is far away from the eye position of the user at the time $T_1$, based on a velocity of a movement of the user 150 relative to the latency of the content visualizing device 110.

For example, in a case in which the user 150 moves at a low velocity relative to the latency, the result of the rendering based on the time $T_1$ may be displayed at the eye position of the user 150 at the time $T_2$ that is not far away from the eye position of the user 150 at the time $T_1$. In such a case, a probability of occurrence of a dynamic X-talk may be extremely low. Unlike this, in a case in which the user 150 moves at a high velocity relative to the latency, the result of the rendering based on the time $T_1$ may be displayed at the eye position of the user 150 at the time $T_2$ that is far away from the eye position of the user 150 at the time $T_1$. In such a case, a probability of occurrence of a dynamic X-talk may be extremely high. The dynamic X-talk may occur based on a velocity of a movement of an eye of the user 150 relative to the latency.

According to an example embodiment, by measuring and quantifying a dynamic X-talk occurring in such various foregoing situations, it is possible to provide an optimal 3D image quality to the user 150.

Hereinafter, an example of how an apparatus for measuring a dynamic X-talk (hereinafter simply a "measuring apparatus") measures a dynamic X-talk occurring by a HUD provided in a vehicle will be mainly described. However, examples are not limited to the example to be described hereinafter. For example, the measuring apparatus may also be applied to measure a dynamic X-talk occurring in a case of combining real information and virtual information as in augmented reality (AR) glasses and a mixed reality (MR) device. In addition, the measuring apparatus may be applied to a 3D display device, such as, for example, a 3D television (TV) and a 3D monitor, in addition to a device configured to display virtual information, such as, for example, an AR device, a virtual reality (VR) device, and an MR device.

Figure 2:
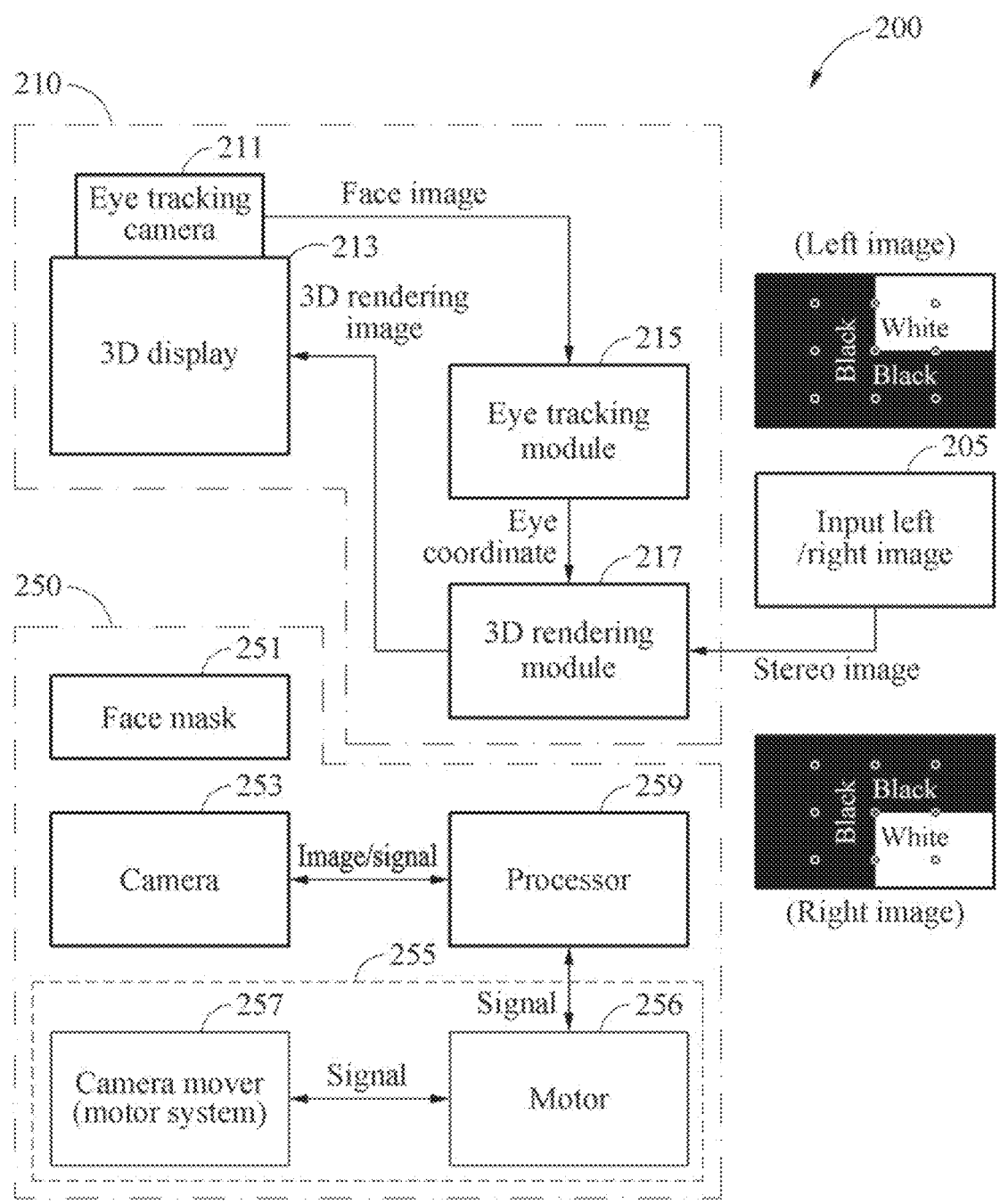
FIG. 2 illustrates an example of a configuration of a system for measuring a dynamic crosstalk according to an example embodiment.

FIG. 2 illustrates an example of a configuration of a system for measuring a dynamic X-talk according to an example embodiment. Referring to FIG. 2, a system 200 for measuring a dynamic X-talk (hereinafter simply a "measuring system" 200) may be configured as follows.

The measuring system 200 includes a 3D display system 210 which is a target from which a dynamic X-talk is to be measured, and a measuring apparatus 250 which is one that measures the dynamic X-talk.

The 3D display system 210 includes an eye tracking camera 211, a 3D display 213, an eye tracking module 215, and a 3D rendering module 217. However, examples of the 3D display system 210 are not limited thereto.

The eye tracking camera 211 may be a device configured to track positions of both eyes of a user and be additionally attached to the 3D display 213. According to some examples, the eye tracking camera 211 may be included in the 3D display 213. The eye tracking camera 211 may include an eye tracker or a sensor, but examples of which are not limited thereto. The 3D display 213 may render a stereo pattern image at positions of the eyes of the user that are detected using the eye tracker or the sensor. Here, the 3D display 213 may set a margin of 3D rendering error in an inward direction from the eyes of the user toward a nose of the user to be small, and set a margin of 3D rendering error in an outward direction from the eyes of the user toward ears of the user to be large. This is because a less X-talk occurs when a face mask 251 moves in the outward direction rather than it moves in the inward direction.

A face image captured by the eye tracking camera 211 and including the positions of the eyes of the user may be transferred to the eye tracking module 215. The eye tracking module 215 may transfer, to the 3D rendering module 217, coordinates of the eyes of the user tracked from the face image. The 3D rendering module 217 may generate a 3D rending image (e.g., a stereo pattern image), by performing 3D rendering on an input left/right image 205 based on the coordinates of the eyes of the user.

According to an example embodiment, it is possible to quantify a dynamic X-talk through one-time image capturing by configuring the input left/right image 205 such that all images used to measure a static X-talk are all present in a single image based on one of the eyes. For this, the input left/right image 205 may be configured such that an image to be visible to one of the eyes is captured from an image captured by a camera 253 for measuring an X-talk. Although to be described in detail hereinafter, the input left/right image 205 may include a plurality of markers. The markers may be arranged at an edge of the 3D display 213 in the input left/right image 205.

The measuring apparatus 250 may detect an actually displayed region in the 3D display 213 and/or positions of various regions for measuring a dynamic X-talk, based on positions of markers included in a stereo pattern image rendered through the 3D display 213.

According to an example embodiment, by simultaneously arranging a white image which is a pattern image for measuring a maximum brightness and a black image which is a pattern image for measuring a minimum brightness in the input left/right image 205, it is possible to measure a dynamic X-talk by capturing once a 3D rendering image provided by the 3D display 213 by the measuring apparatus 250 using the camera 253.

The 3D display 213 may be, for example, a glassless 3D display, a HUD, or a transparent display of an AR device such as AR glasses, but examples of which are not limited thereto. The 3D display 213 may be construed as encompassing various types of displays from which a dynamic X-talk may occur.

The 3D display 213 may display a left image to a left eye of the user and a right image to a right eye of the user. To display the corresponding images to the left eye and the right eye, the 3D display 213 may use a binocular separator configured to allow light generating from a panel of the 3D display 213 to face a certain direction (e.g., a direction corresponding to the left eye or the right eye). The binocular separator may be, for example, a lenticular lens or a barrier that is attached onto the panel of the 3D display 213, but examples of which are not limited thereto.

The binocular separator may have design parameters including, for example, a slanted angle, a thickness, and a pitch with a certain period. The left image and the right image may be generated based on the design parameters. The generating of the left image for the left eye of the user and the right image for the right eye of the user may be referred to as 3D rendering. However, there may be a difference between a designed value and a manufacturing value when manufacturing the binocular separator. Thus, when performing the 3D rendering using the designed value, the left image and the right image for the left eye and the right eye, respectively, may not be viewed accurately. In such a case, an X-talk occurring when a portion or an entire portion of the right image is visible to the left eye or a portion or an entire portion of the left image is visible to the right eye may be reduced using 3D calibration that calculates an accurate manufacturing value of the binocular separator. The 3D display system 210 may generate a stereo pattern image to be matched to positions of both eyes of the user using parameters of an optical layer obtained through the 3D calibration. The optical layer may be, for example, a lenticular lens, but examples of which are not limited thereto. The parameters of the optical layer may include, for example, a width, an inclination, a thickness, and the like of the optical layer.

However, even when the accurate manufacturing value is calculated through the 3D calibration and then the 3D rendering is performed, there still may be an optical limitation of the binocular separator. Thus, the right image may be visible to the left eye at an extremely small ratio. Thus, before quantifying an X-talk, the 3D calibration may need to be performed. Under the assumption that the 3D calibration is performed by various published methods, a detailed description of the 3D calibration will be omitted here.

According to an example embodiment, it is possible to measure an X-talk by arranging, at an eye position of a user (e.g., viewer), the camera 253 arranged at a front of the 3D display 213.

After attaching the face mask 251 having a facial form to a front side of the camera 253 for measuring an X-talk such that the camera 253 is arranged at the eye position of the user, the eye tracking camera 211 may detect the eye position in the face mask 251, and the 3D display 213 may perform the 3D rendering on an image corresponding to the eye position and display the rendered image.

The measuring apparatus 250 includes the face mask 251, the camera 253, a driver 255, and a processor 259. However, examples of the measuring apparatus 250 are not limited to the foregoing.

The measuring apparatus 250 may be arranged at an optimal viewing distance of the 3D display 213.

The face mask 251 may be a face model in which positions of both eyes of the user are set. The face mask 251 may include a face model (e.g., a face mask 630 in FIG. 6B) including eyes, a nose, and lips, and be a mask in which a distance between the eyes is set in advance. Here, at least one eye of the eyes in the face mask 251 may be opened, and it is thus possible to allow the camera 253 disposed at a corresponding position to capture an image there is three-dimensionally rendered by the 3D display 213. In the face mask 251, a distance between the eyes of the user, or an inter pupil distance (IPD), may be adjusted to be 60 millimeters (mm), 65 mm, 70 mm, and the like. An example of the face mask 251 is illustrated in FIG. 6B.

The camera 253 may be a camera configured to capture a dynamic X-talk occurring by the 3D display 213. The camera 253 may capture a stereo pattern image output through the 3D display 213 of the 3D display system 210 at a position of at least one eye (e.g., left eye) of the face mask 251. Here, the 3D display 213 may be a measurement target from which whether a dynamic X-talk occurs is to be determined or a dynamic X-talk is to be quantified. Hereinafter, an example of capturing a stereo pattern image at a position of a left eye of a user will be described for the convenience of description, but examples are not limited thereto. The stereo pattern image may also be captured from each of positions of left and right eyes of the user.

The camera 253 may be arranged such that the stereo pattern image output through the 3D display 213 is captured at the position of the at least one eye of both eyes of the user. For example, to capture a left image of the 3D display 213, the camera 253 may be arranged behind the left eye of the face mask 251. Here, detecting a position of the camera 253 that moves continuously may be important, and thus the position of the camera 253 may be detected using the eye tracking camera 211 connected to the 3D display system 210. In addition, to match an eye position more accurately, the camera 253 may also be arranged at an eye position indicated in the face mask 251 of the facial form.

The camera 253 may be, for example, an image sensor such as a complementary metal-oxide-semiconductor (CMOS) sensor or a charge-coupled device (CCD) sensor, or a CMOS camera, a CCD camera, or a luminance meter. The camera 253 may be implemented by a single camera for one of both eyes of the user, or multiple cameras or a stereo camera for both eyes of the user. The camera 253 may be arranged at an optimal viewing position of the 3D display 213.

To measure a dynamic X-talk, a velocity of the camera 253 at a time at which the camera 253 captures the stereo pattern image output from the 3D display 213 needs to be known, and thus synchronization between the camera 253 and the driver 255 may be required. In addition, to measure a dynamic X-talk, unlike a static X-talk, a movement direction may be important, and thus the processor 259 may consider both a velocity and a direction of a dynamic movement of the camera 253 to measure a dynamic X-talk occurring by the 3D display 213.

The driver 255 may cause the camera 253 to have a dynamic movement. The driver 255 includes a motor 256 and a camera mover 257. The motor 256 may provide the camera mover 257 with power for providing the dynamic movement to the camera 253. The camera mover 257 may move the camera 253 by using the power provided by the motor 256 in a direction and at a velocity to simulate or imitate a movement of the user. The driver 255 may exert force to the camera 253 so that the camera 253 moves in a certain fixed direction or at a certain fixed velocity, or moves in a variable direction and a variable velocity.

The camera mover 257 may move the camera 253 by the power provided by the motor 256 at a constant velocity in the direction to simulate or imitate the movement of the user under the control of the processor 259. In addition, the camera mover 257 may cause the camera 253 to have the dynamic movement by varying at least one of the direction or the velocity of the camera 253 under the control of the processor 259.

The processor 259 may measure a dynamic X-talk occurring by the 3D display 213 by extracting a plurality of regions from an image captured by the camera 253 to which the dynamic movement is applied. For example, the image captured by the camera 253 may include a first region corresponding to a first pattern (e.g., white) image for measuring a maximum brightness (e.g., 255), a second region corresponding to a second pattern (e.g., black) image for measuring a minimum brightness (e.g., 0), and a third region corresponding to a third pattern (e.g., black) for measuring a brightness offset of the 3D display 213.

The processor 259 may detect a plurality of markers that divide the captured image into the regions corresponding to the maximum brightness and the minimum brightness. The processor 259 may extract the regions based on the markers and measure a dynamic X-talk based on a brightness value of pixels measured from each of the regions.

In addition, the processor 259 may measure a dynamic X-talk by extracting the regions from the image captured by the camera 253, based on a distance between the eyes adjusted in the face mask 251 and on the dynamic movement.

According to some examples, the processor 259 may compensate for an X-talk based on a position of the camera 253 moved by the dynamic movement.

The measuring of a dynamic X-talk by the processor 259 will be described in greater detail with reference to FIGS. 3 and 4.

Figure 3:
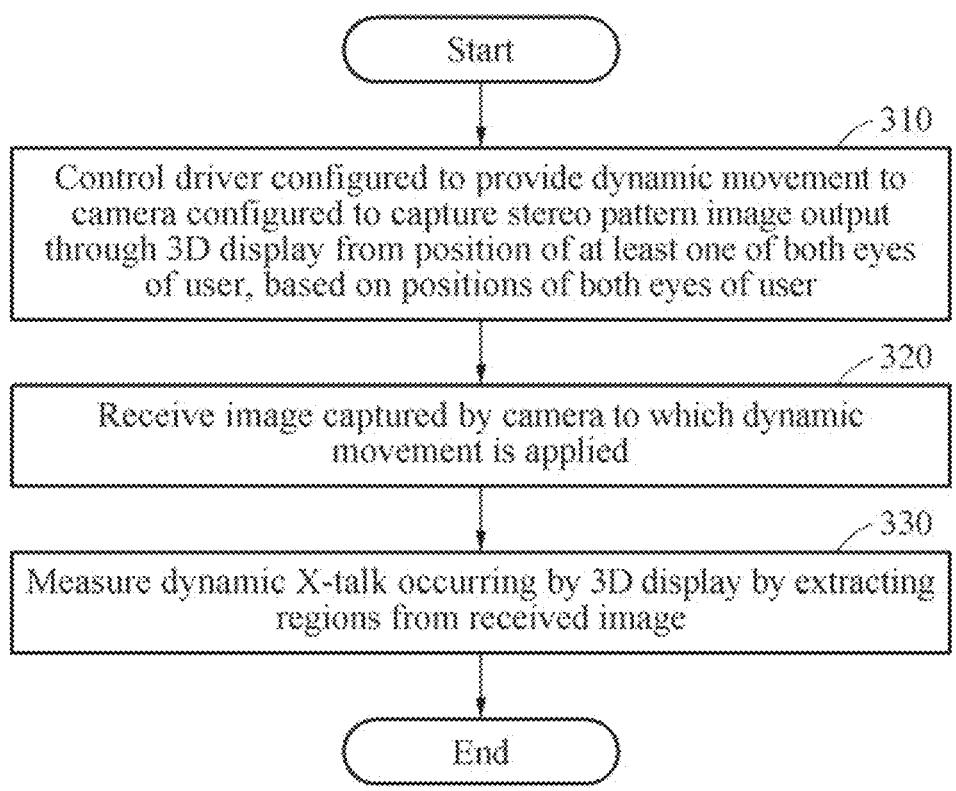
FIG. 3 illustrates a flowchart of an example of a method of measuring a dynamic crosstalk according to an example embodiment.

FIG. 3 illustrates a flowchart of an example of a method of measuring a dynamic X-talk according to an example embodiment. FIG. 4 illustrates an example of an operation of a measuring apparatus for measuring a dynamic X-talk according to an example embodiment. Referring to FIGS. 3 and 4, a measuring apparatus for measuring a dynamic X-talk may measure a dynamic X-talk by performing operations 310 through 330 to be described hereinafter with reference to FIG. 3.

In operation 310, the measuring apparatus controls a driver to cause a camera to have a dynamic movement. The camera may capture a stereo pattern image that is output through a 3D display at a position of at least one of both eyes of a user, while the camera is in the dynamic movement. The 3D display may be, for example, a glassless 3D display, a HUD, or a transparent display of an AR device such as AR eyeglasses. However, examples of the 3D display are not limited thereto. The 3D display may be construed as encompassing various types of displays from which a dynamic X-talk may occur. The 3D display may receive positions of the eyes of the user that are tracked by an eye tracker, for example. When the 3D display outputs the stereo pattern image based on the received positions of the eyes, the driver of the measuring apparatus may control a movement of the camera so that the camera makes a dynamic movement while capturing the stereo pattern image output from the 3D display at the position of the at least one of the eyes of the user. The camera may be one that captures or measures an X-talk.

Figure 4:
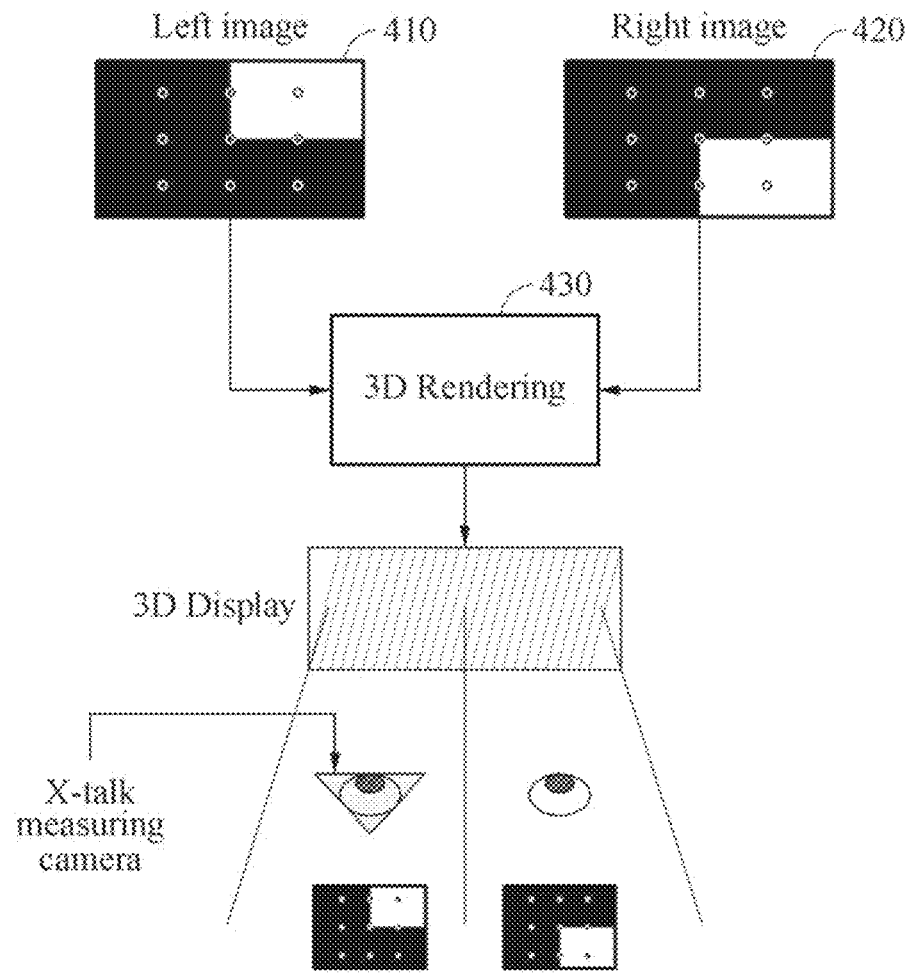
FIG. 4 illustrates an example of an operation of an apparatus for measuring a dynamic crosstalk according to an example embodiment.

In operation 310, the stereo pattern image output through the 3D display may include a left image 410 for a left eye of the user and a right image 420 for a right eye of the user, as illustrated in FIG. 4.

Figure 5A:
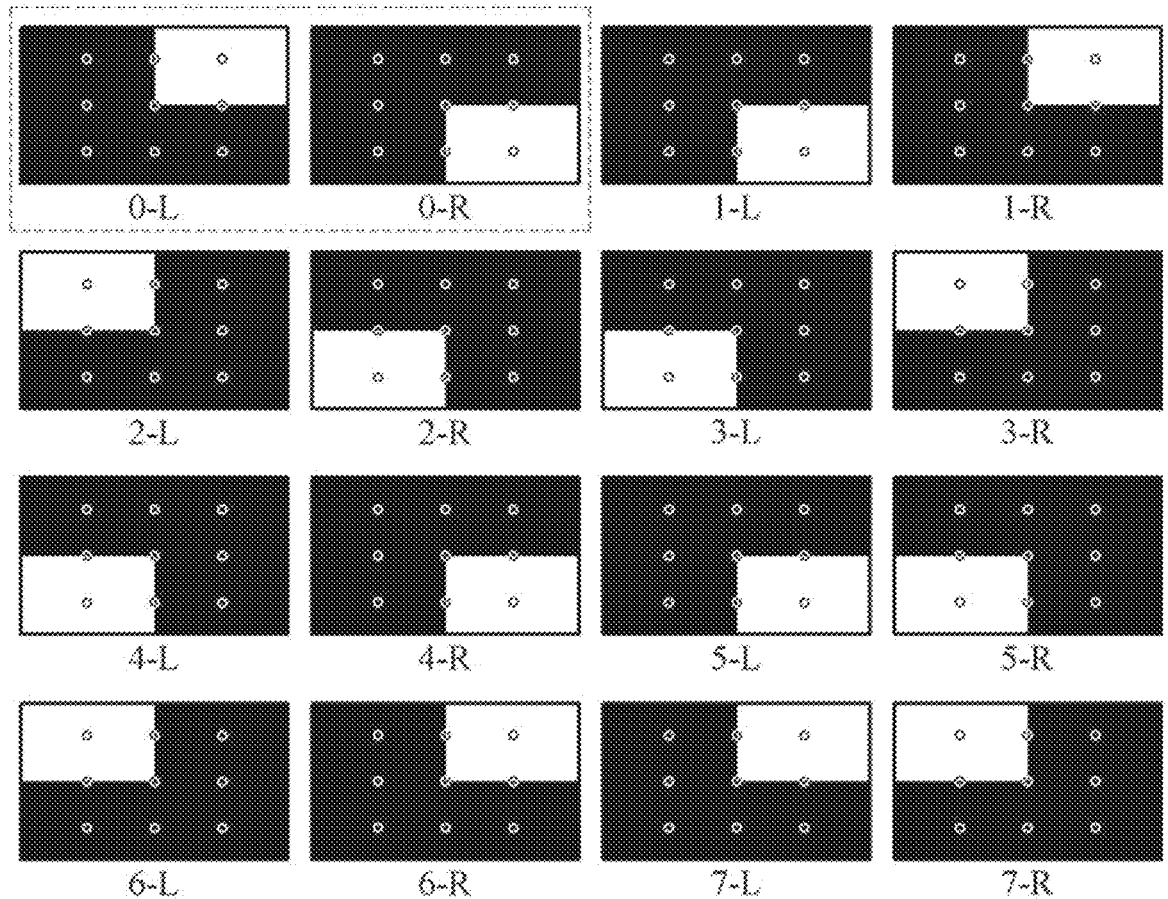
FIGS. 5A and 5B illustrate examples of a stereo pattern image according to an example embodiment.
Figure 5B:
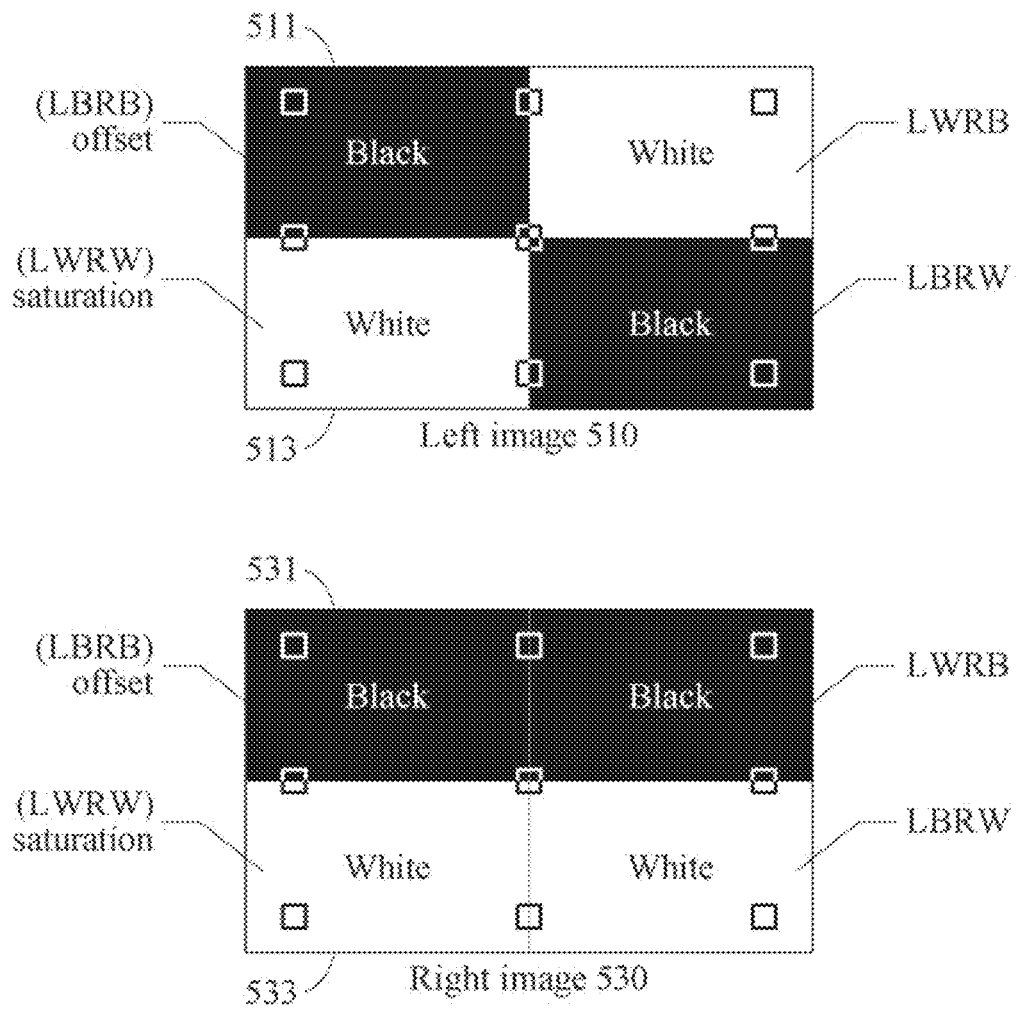

The measuring apparatus may capture the stereo pattern image including the left image 410 and the right image 420 in order to measure the dynamic X-talk through one-time capturing. The stereo pattern image may include, for example, three regions as illustrated in FIG. 5A, or four regions as illustrated in FIG. 5B. For example, the stereo pattern image may include a first region corresponding to a first pattern image for measuring a maximum brightness, a second region corresponding to a second pattern image for measuring a minimum brightness, and a third region corresponding to a third pattern image for measuring a brightness offset of the 3D display. Alternatively, the stereo pattern image may include a first region corresponding to a first pattern image for measuring a maximum brightness, a second region corresponding to a second pattern image for measuring a minimum brightness, a third region corresponding to a third pattern image for measuring a brightness offset of the 3D display, and a fourth region corresponding to a fourth pattern image for measuring a degree of saturation of the camera. Examples of the stereo pattern image are illustrated in FIGS. 5A and 5B.

The camera may be a single camera for one of both eyes of the user, or multiple cameras or a stereo camera for both eyes of the user. The camera may be arranged at an optimal position (e.g., at a height corresponding to the eyes in front of the 3D display) for viewing the stereo pattern image output through the 3D display. For example, the position of the camera may correspond to a position of at least one eye of a face mask arranged in a direction facing the 3D display. In addition, the settings of the camera may be adjusted to prevent saturation from occurring.

In operation 310, the measuring apparatus may control the driver to cause the camera to move at a constant velocity or move in a variable direction and/or a variable velocity to simulate or imitate a movement of the user. The direction that simulates a movement of the user may include an inward direction from eyes to nose and an outward direction from eyes to ears, but examples of which are not limited thereto. According to some examples, the direction that simulates a movement of the user may further include a vertical direction and/or a six degrees of freedom (DoF) direction, in addition to a horizontal direction such as the inward and outward directions, based on an environment in which the 3D display is provided.

In operation 310, the measuring apparatus may adjust a distance between the eyes of the user that is captured by the camera in order to simulate or imitate the movement of the user. Operation 310 of controlling the driver by the measuring apparatus will be described in greater detail with reference to FIGS. 6A and 6B.

In operation 320, the measuring apparatus receives an image captured by the camera to which the dynamic movement controlled by the driver in operation 310 is applied. For example, in operation 320, the measuring apparatus may capture the stereo pattern image output through the 3D display at the position of the at least one eye of the user based on a distance between the eyes adjusted by the camera to which the dynamic movement is applied, and receive the image obtained by capturing the stereo pattern image by the camera. For example, the measuring apparatus may capture, at the position of the at least one eye, the stereo pattern image output through the 3D display in an interval in which the camera is in the dynamic movement at a constant velocity. In this example, when an eye tracking camera detects an eye position in the face mask, and the 3D display then performs 3D rendering 430 on an image corresponding to the eye position and displays an image obtained through the 3D rendering 430, the measuring apparatus may capture the image that is three-dimensionally rendered by the 3D display using the camera to which the dynamic movement controlled by the driver is applied.

According to some examples, in an interval in which the camera is in the dynamic movement at a certain velocity (e.g., 200 mm/sec) or higher, the 3D display may perform two-dimensional (2D) rendering on the image corresponding to the eye position and display the two-dimensionally rendered image. In an interval in which the camera is in the dynamic movement at a constant velocity less than the certain velocity, the 3D display may perform 3D rendering on the image corresponding to the eye position and display the three-dimensionally rendered image.

According to an example embodiment, as described above, the 3D display may generate an image as described above based on a velocity and/or a characteristic of a movement of the user (e.g., a driver).

The measuring apparatus may measure a dynamic X-talk by analyzing the image captured in the interval in which the camera is in the dynamic movement at a constant velocity. In operation 330, the measuring apparatus measures a dynamic X-talk occurring by the 3D display by extracting a plurality of regions from the image received in operation 320. The dynamic X-talk may be quantified as represented by Equation 1 based on a left eye of the user, for example.

$$X\text{-talk}(\%) = \sum_{x,y \in Range} \left( \frac{LBRW_L[x,y] - LBRB_L[x,y]}{LWRB_L[x,y] - LBRB_L[x,y]} \right) \times 100 \quad \text{[Equation 1]}$$

In Equation 1, $LWRB_L[x,y]$ denotes a brightness value of a region (LWRB) in which a white image is output to a left eye of a user and a black image is output to a right eye of the user. $LBRW_L[x,y]$ denotes a brightness value of a region (LBRW) in which a black image is output to the left eye and a white image is output to the right eye, based on the left eye of the user. In addition, $LBRB_L[x,y]$ denotes a brightness value of a region (LBRB) in which a black image is output to both eyes of the user based on the left eye of the user. $LBRB_L[x,y]$ denotes an offset of the 3D display. L denotes the left eye and R denotes the right eye. W denotes a white pattern image and B denotes a black pattern image. In addition, x and y denote pixel positions in an image captured by the camera that measures an X-talk.

Equation 1 indicates a ratio of a right image at which the right image is visible to the left eye of the user. Based on Equation 1, the measuring apparatus may calculate a position of a pixel corresponding to a screen area of the 3D display in the captured image.

The image received in operation 320 may include a first region corresponding to a first pattern image for measuring a maximum brightness, a second region corresponding to a second pattern image corresponding to a minimum brightness, and a third region corresponding to a third pattern image for measuring a brightness offset of the 3D display. Hereinafter, the measuring of a dynamic X-talk by the measuring apparatus will be described in greater detail with reference to FIGS. 7 through 9.

According to some examples, the measuring apparatus may output a value that is obtained by measuring a dynamic X-talk and quantifying the measured dynamic X-talk. Alternatively, the measuring apparatus may compensate for the dynamic X-talk based on a position of the camera moved by the provided dynamic movement.

FIGS. 5A and 5B illustrate examples of a stereo pattern image according to an example embodiment.

According to an example embodiment, a portion of a stereo pattern image may include a 2D pattern, and a remaining portion of the stereo pattern image may include a 3D pattern. For example, a same black pattern may be indicated in a half region on one side of a left image and a half region on the same side of a right image, and opposite black and white patterns may be indicated in a half region on the other side of the left image and a half region on the same other side of the right image. In such an example, using the black region in the 2D pattern, an offset may be calculated. In addition, based on the offset, an X-talk occurring by the 3D pattern may be calculated.

Referring to FIG. 5A, examples of a stereo pattern image may be obtained by changing a position of each of an LWRB region, an LBRW region, and an LBRB region.

For example, the stereo pattern image may include a left image for a left eye of both eyes of a user that is divided into three regions including 1-1 region of a first size at an upper right end, 1-2 region of the first size at a lower right end, and 1-3 region of a second size greater than the first size on a left side, and a right image for a right eye of both eyes of the user that is divided into three regions including 2-1 region of the first size at an upper right end, 2-2 region of the first size at a lower right end, and 2-3 region of the second size on a left side. In this example, 1-1 region may correspond to 2-1 region, 1-2 region may correspond to 2-2 region, and 1-3 region may correspond to 2-3 region. In addition, in 1-1 region and 1-2 region, pattern images having different brightness may be arranged. In 1-3 region, a pattern image having the same brightness corresponding to one of 1-1 region and 1-2 region may be arranged. In addition, in a pair of 1-1 region and 2-1 region and a pair of 1-2 region and 2-2 region, pattern images having different brightness combinations may be arranged. In 1-3 region and 2-3 region, pattern images having the same brightness may be arranged. Here, that images having different brightness combinations are arranged may be construed that, for example, images with different brightness may be arranged in 1-1 region (maximum brightness image) and 2-1 region (minimum brightness image), and images with different brightness may be arranged in 1-2 region (minimum brightness image) and 2-2 region (maximum brightness image).

In the example of FIG. 5A, 0-L and 0-R correspond to a stereo pattern image indicating an input pair for a left eye and a right eye of a user. In addition, 1-L and 1-R correspond to a stereo pattern image in which a portion of 1-L is arranged in black (left side), in white (lower right end), and in black (upper right end), and a portion of 1-R is arranged in black (left side), in white (upper right end), and in black (lower right end).

For example, eight pairs of stereo pattern images illustrated in FIG. 5A may be used to measure a dynamic X-talk. A condition for a stereo pattern image may include, for example, an image pattern of a form from which a maximum brightness is to be measured once from the left eye and a minimum brightness is to be measured once from the left eye, after 3D rendering, and from which an offset of the 3D display is to be measured.

In each of 0-L image and 0-R image, a black region on the left side may be to measure an offset, and a region on the right side in which black and white alternate may be to measure a maximum brightness value and a minimum brightness value. Dissimilar to a static X-talk that needs to be measured by capturing multiple images based on time because an eye of a user is fixed, a dynamic X-talk may not be easy to measure because a measurement position varies when multiple images are captured based on time.

Thus, according to an example embodiment, a dynamic X-talk may be measured by capturing all (e.g., a maximum brightness, a minimum brightness, and an offset of the 3D display) from a single image. According to some examples, after measuring an X-talk using each of the stereo pattern images, a dynamic X-talk may be measured by calculating an average based on a moving velocity of the camera. A plurality of circular markers included in the stereo pattern images in FIG. 5A will be described in detail with reference to FIGS. 7 through 9.

According to an example embodiment, a 2D pattern included in a portion of a stereo pattern image may indicate a black-white pattern instead of a single black pattern. For example, a same black-white pattern may be indicated in a half region on one side of the left image and a half region on the same one side of the right image. In addition, opposite black-white patterns may be indicated in a half region on the other side of the left image and a half region on the same other side of the right image. In such an example, an offset may be calculated using a black region in the 2D pattern, and saturation may be calculated using a white region in the 2D pattern. In addition, based on the offset and the saturation, an X-talk occurring by a 3D pattern may be calculated.

Referring to FIG. 5B, there is an example of a stereo pattern image in which each of a left image 510 and a right image 530 is divided into four regions. According to some examples, a marker may be provided in a square shape as illustrated in FIG. 5B.

According to an example embodiment, the left image 510 of the stereo pattern image may include a black pattern image in 1-1 region at an upper left end 511 and 1-3 region at a lower right end, and a white pattern image in 1-2 region at a lower left end 513 and 1-4 region at an upper right end. In addition, the right image 530 of the stereo pattern image may include a black pattern image in 2-1 region at an upper left end 531 and 2-4 region at an upper right end, and a white pattern image in 2-2 region at a lower left end 533 and 2-3 region at a lower right end.

The black pattern image at the upper left end 511 may be to measure an offset of the 3D display, and the white pattern image at the lower left end 513 may be to measure a degree of saturation of the camera. In a case in which there is saturation occurring in an image obtained by the camera when measuring an X-talk, an error may occur.

To measure a degree of saturation of the camera, an average value of pixels may be verified by detecting a region at the lower left end 513 of the left image 510 or a region at the lower left end 533 of the right image 530. When the average value is greater than a preset brightness value (e.g., 250), by reducing a gain of the camera, it is possible to prevent a measurement error from occurring due to the saturation of the camera.

Figure 6A:
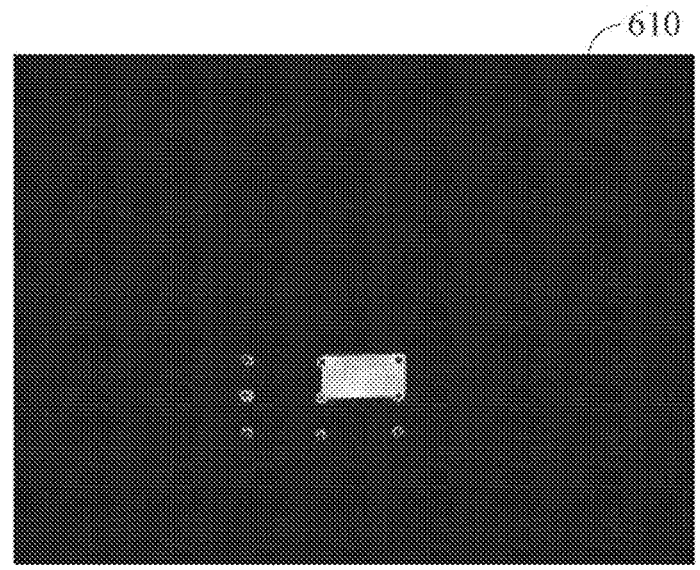
FIGS. 6A and 6B illustrate examples of controlling a driver configured to provide a dynamic movement to a camera according to an example embodiment.
Figure 6A:
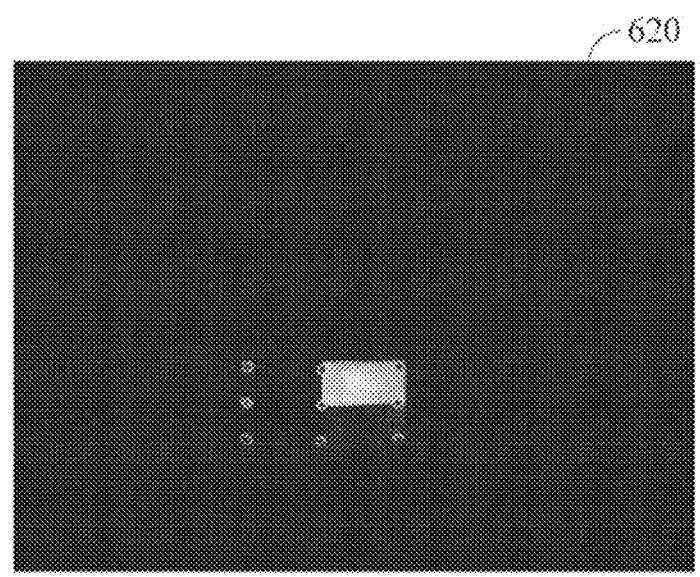
Figure 6B:
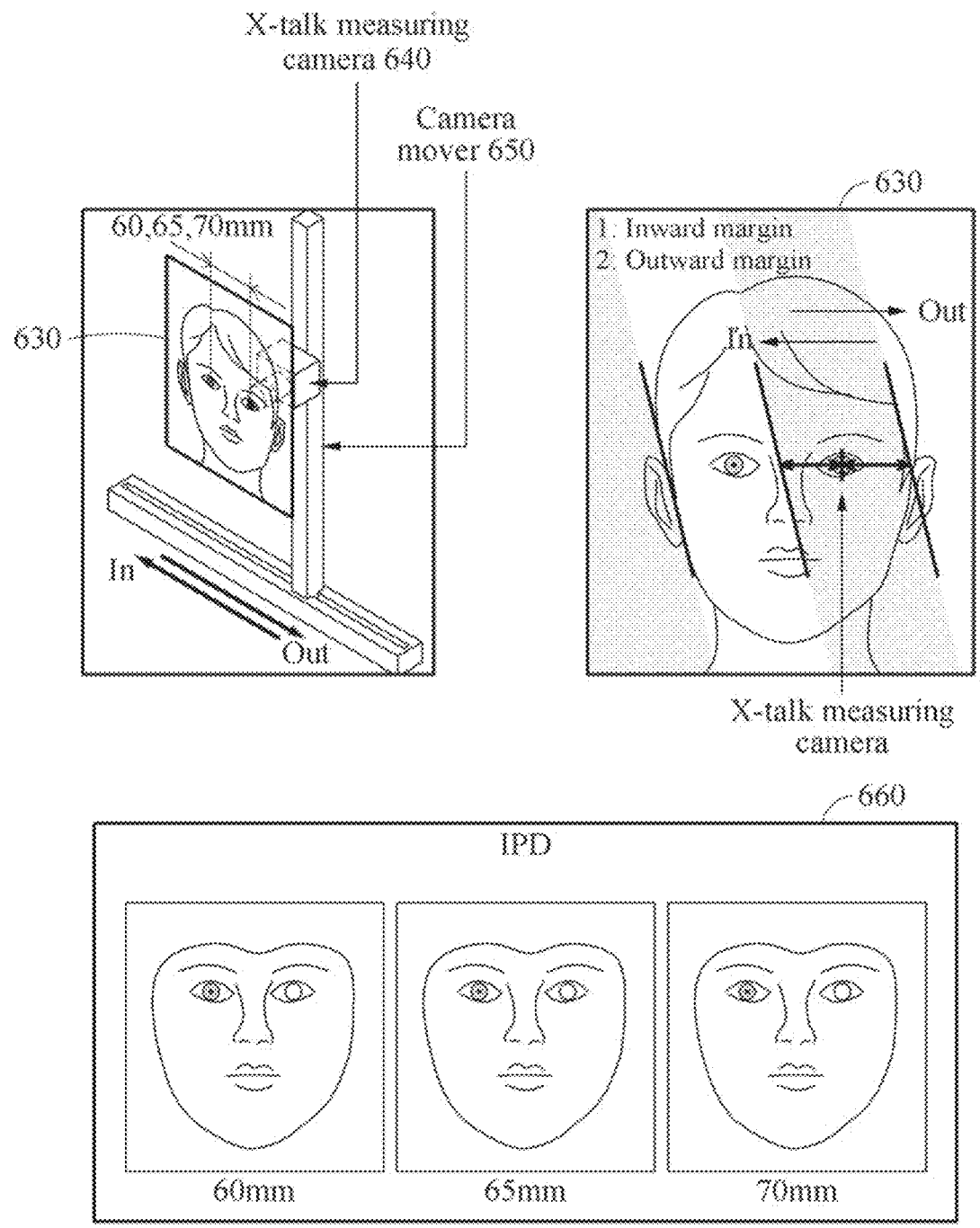

FIGS. 6A and 6B illustrate examples of controlling a driver to cause a camera to have a dynamic movement according to an example embodiment. FIG. 6A illustrates stereo pattern images 610 and 620 captured by a camera being in a dynamic movement at different constant velocities. FIG. 6B illustrates a relationship between an arrangement of a face mask 630 and an arrangement of a camera 640, and a plurality of face masks 660 having different pupillary distances.

According to an example embodiment, to measure a dynamic X-talk, a dynamic movement in a certain direction and/or at a certain velocity may be provided to a face mask 630 illustrated in FIG. 6B. As the dynamic movement is given to the face mask 630, a camera 640 attached behind a left eye of the face mask 630 may capture an image to be viewed by a left eye of a user. Here, when saturation occurs in the camera 640, an error may occur when measuring an X-talk, and thus a measuring apparatus may adjust a gain of the camera 640 to prevent the saturation from occurring.

The measuring apparatus may measure a dynamic X-talk in an interval in which the camera moves at a constant velocity. For the measurement, a camera mover 650 configured to provide the dynamic movement to the camera 640 may accelerate at an initial stage by a motor, move at a constant velocity from a certain position, and then decelerate to come to a halt. The measuring apparatus may not measure an X-talk during the acceleration and deceleration for the dynamic movement of the camera 640, but may measure an X-talk when the camera 640 moves at a constant velocity.

Referring to FIG. 6A, there are a stereo pattern image 610 captured when the camera 640 moves at a low constant velocity of 20 mm/sec, and a stereo pattern image 620 captured when the camera 640 moves at a high constant velocity of 260 mm/sec.

In the stereo pattern image 610, an upper right end and a lower right end may be captured in clear white and clear black. However, in the stereo pattern image 620, there may be an X-talk occurring, and an upper right end and a lower right end may be captured in dark white and bright black.

That is, when the camera 640 is in a dynamic movement at a high speed, a dynamic X-talk may occur due to the latency described above.

According to an example embodiment, a dynamic X-talk may be measured by controlling the camera mover 650 to change a velocity of a movement of the face mask 630 in a form of a face, that is, a velocity of a dynamic movement of the camera 640 attached to the face mask 630, from 20 mm/sec to 260 mm/sec, for example. The measuring apparatus may control the camera mover 650 to move at a uniform velocity using the motor.

In addition, the measuring apparatus may measure a dynamic X-talk by controlling the camera mover 650 to provide a dynamic movement of which a direction of the dynamic movement is varied in addition to a velocity of the dynamic movement. Based on the direction of the dynamic movement, a dynamic X-talk to be measure may vary. Thus, the measuring apparatus may measure a dynamic X-talk by controlling the camera mover 650 such that the camera 640 moves in an inward margin direction (1) from both eyes of a user to a nose of the user and in an outward margin direction (2) from both eyes of the user to ears of the user.

Alternatively, the measuring apparatus may measure a dynamic X-talk by varying a distance between both eyes to, for example, 60 mm, 65 mm, and 70 mm as illustrated in face masks 660 in FIG. 6B.

Figure 7:
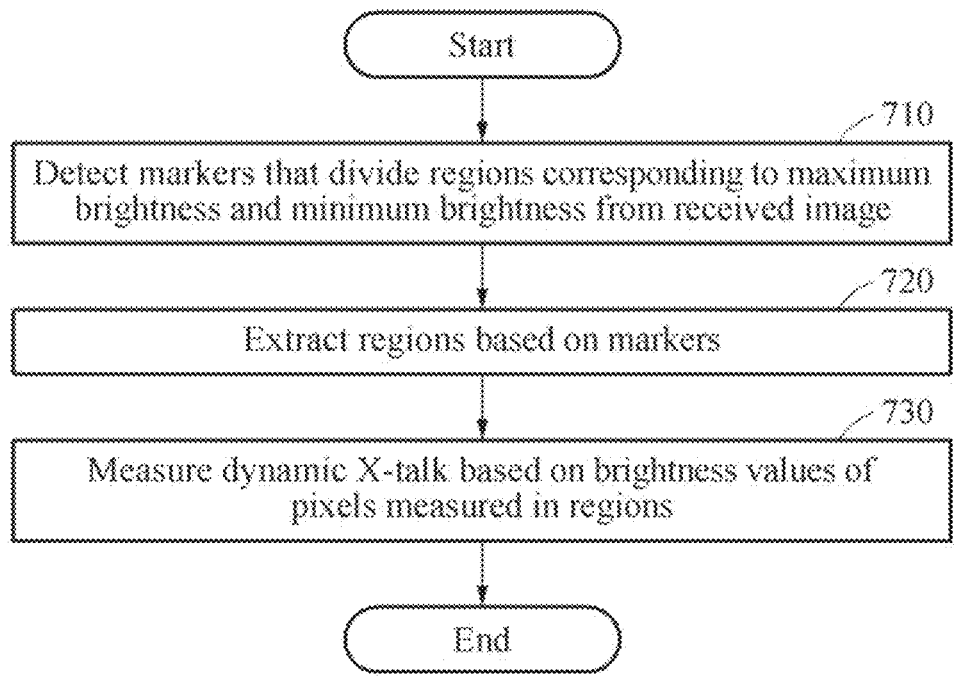
FIG. 7 illustrates a flowchart of an example of a method of measuring a dynamic crosstalk according to an example embodiment.

FIG. 7 illustrates a flowchart of an example of a method of measuring a dynamic X-talk according to an example embodiment. Referring to FIG. 7, a measuring apparatus may measure a dynamic X-talk by performing operations 710 through 730 to be described hereinafter with reference to FIG. 7.

In operation 710, the measuring apparatus detects a plurality of markers that indicates a plurality of regions corresponding to a maximum brightness and a minimum brightness from the image received in operation 320 described above with reference to FIG. 3. The detecting of the markers by the measuring apparatus will be described in greater detail with reference to FIG. 8.

In operation 720, the measuring apparatus extracts the regions based on the markers detected in operation 710. The extracting of the regions by the measuring apparatus will be described in greater detail with reference to FIG. 9.

In operation 730, the measuring apparatus measures a dynamic X-talk based on a brightness value of pixels measured from each of the regions extracted in operation 720. For example, an average of the dynamic X-talk measured in operation 730 may be calculated based on a velocity of a dynamic movement, and the average may be output as a result of measuring the dynamic X-talk.

According to some examples, in a case in which a camera captures a left image to be provided to a left eye of a user and a right image to be provided to a right eye of the user, the measuring apparatus may detect markers that divide a plurality of regions from each of the left image and the right image, and measure a dynamic X-talk based on a statistical value of brightness values of pixels measured from the regions extracted based on the markers. The statistical value may include, for example, an average, a variance, and a standard deviation, but examples of which are not limited thereto.

Figure 8:
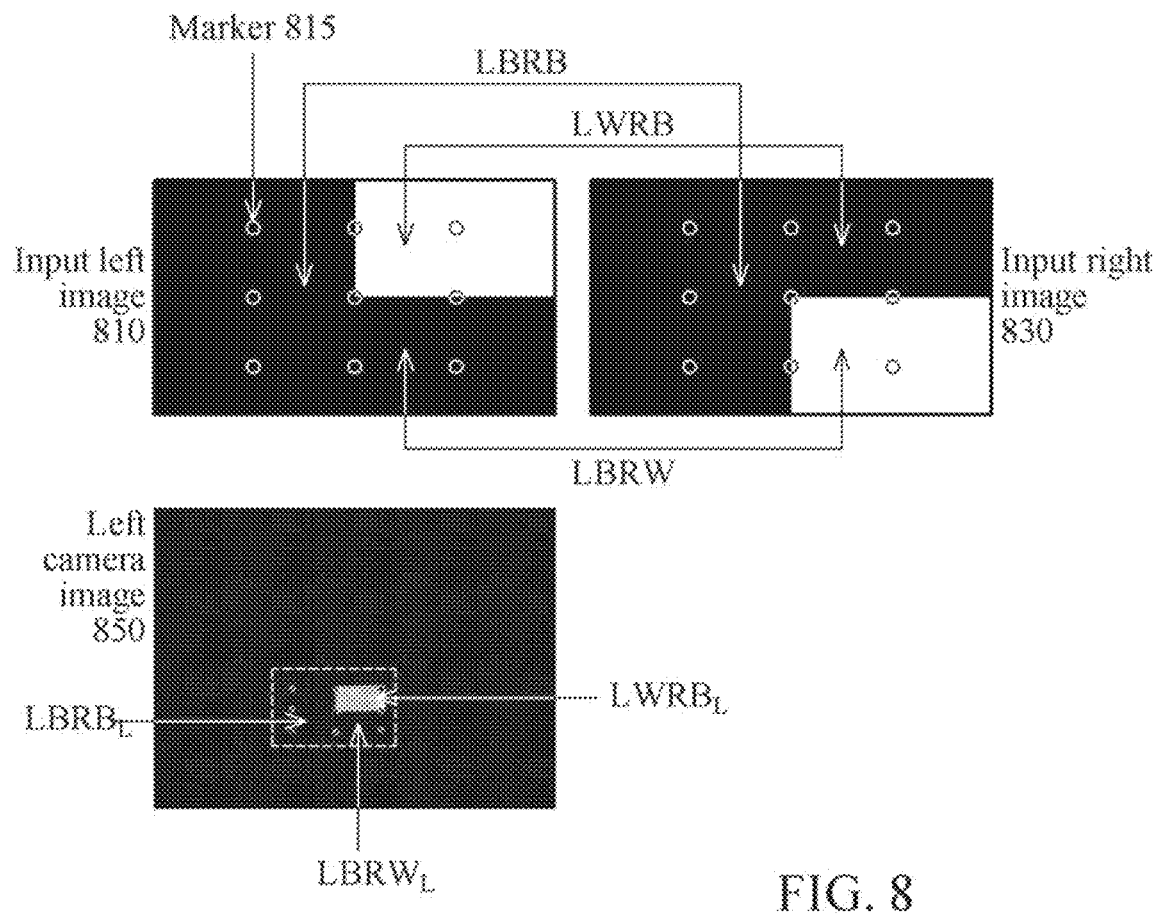
FIG. 8 illustrates an example of detecting markers that divide a plurality of regions according to an example embodiment.

FIG. 8 illustrates an example of detecting markers that divide a captured image into a plurality of regions according to an example embodiment. In the example of FIG. 8, illustrated are an input left image 810 and an input right image 830 each including markers 815, and a left camera image 850 obtained by capturing the input left image 810 and the input right image 830 from a position of a left eye of a user.

Each of the markers 815 may be in a circular form with an inside in black and an edge in white as illustrated in FIG. 8. The markers 815 may be provided in various forms, for example, a quadrangle, a triangle, and an asterisk, but examples of which are not limited thereto.

A measuring apparatus may detect the markers 815 through image processing, pattern recognition, or deep learning, for example. The measuring apparatus may identify and detect the markers 815 included in the input images 810 and 830 through a neural network that recognizes a pattern of the markers 815 in advance or learns the pattern in advance.

The measuring apparatus may determine or classify, by the markers 815, a plurality of regions corresponding to a maximum brightness and a minimum brightness in the received input images 810 and 830.

The markers 815 may be used to find a region in a 3D display in which actual displaying is performed. In addition, the markers 815 may be used to find an LWRB region in which a white image is output to the left eye of the user and a black image is output to the right eye of the user, an LBRW region in which a black image is output to the left eye and a white image is output to the right eye, and an LBRB region in which a black image is output to both eyes of the user.

The markers 815 may be arranged at an edge of the 3D display in the input left image 810 and the input right image 830. Thus, the measuring apparatus may find the edge of the 3D display that is indicated in a broken line in the left camera image 850 using the markers 815.

In addition, the measuring apparatus may find an $LWRB_L$ region in which a white image is output to the left eye and a black image is output to the right eye, an $LBRW_L$ region in which a black image is output to the left eye and a white image is output to the right eye, and an $LBRB_L$ region in which a black image is output to both eyes of the user, in the left camera image 850, using the markers 815.

Here, the regions divided by the markers 815 may correspond to regions in a screen area of the 3D display from which an X-talk is to be measured, and may correspond to ranges of measuring an X-talk in an equation of measuring an X-talk.

When 3D rendering is performed on the input left image 810 and the input right image 830, a portion (e.g., left, right, upper, or lower portion) of an actual screen of the 3D display may be cut and not be viewed as illustrated in the left camera image 850. Thus, according to an example embodiment, by setting an actual display region using the markers 815 and analyzing an image (e.g., left camera image 850) captured by a camera for measuring an X-talk, it is possible to measure a dynamic X-talk.

The measuring apparatus may measure an X-talk by applying, to Equation 1 above, a brightness value of each of the regions (e.g., $LWRB_L$, $LBRW_L$, and $LBRB_L$ regions) found in the left camera image 850.

Figure 9:
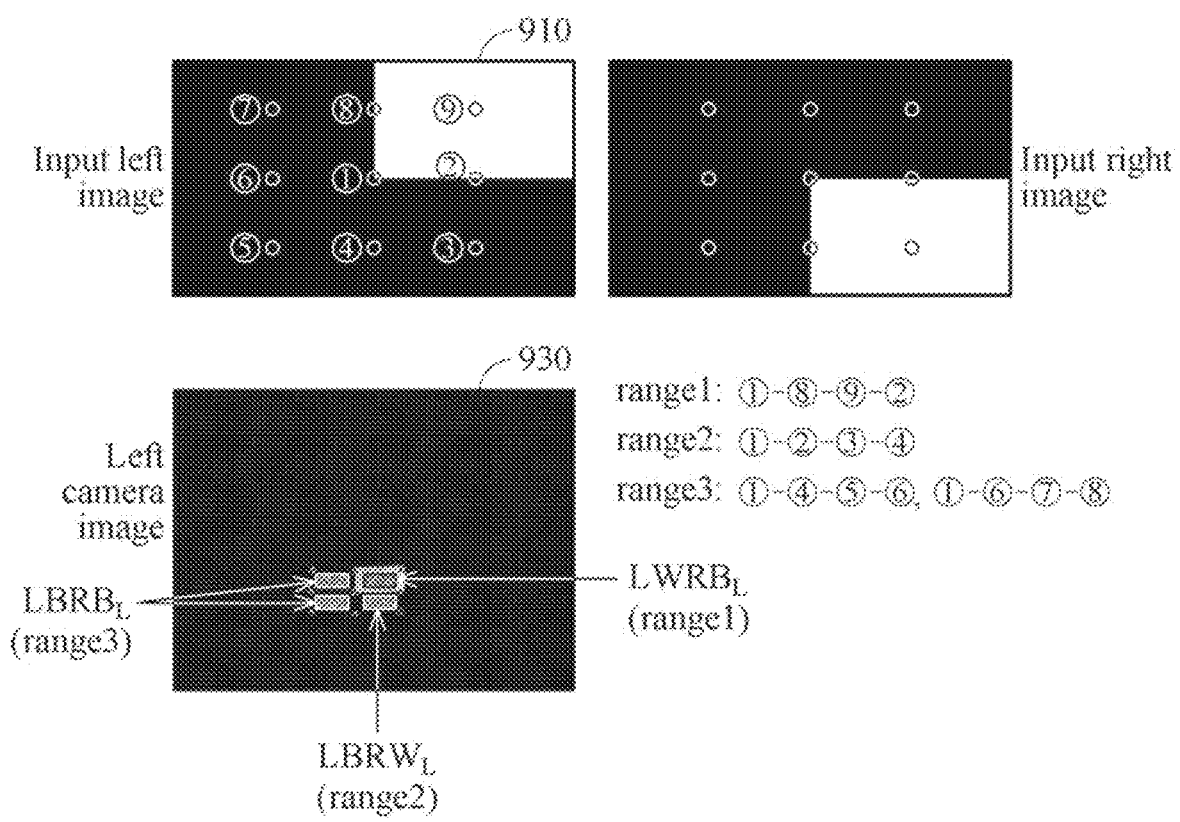
FIG. 9 illustrates an example of extracting a plurality of regions based on markers according to an example embodiment.

FIG. 9 illustrates an example of extracting a plurality of regions based on markers according to an example embodiment. In the example of FIG. 9, illustrated are a plurality of regions $LWRB_L$, $LBRW_L$, and $LBRB_L$ extracted from a left camera image 930 using center points of markers detected as described above with reference to FIG. 8.

A measuring apparatus may detect markers and extract a plurality of regions as follows.

The measuring apparatus may remove noise from the left camera image 930 captured by a camera (e.g., camera 253 of FIG. 2) configured to capture a dynamic X-talk. The measuring apparatus may remove the noise from the left camera image 930 captured through filtering by filters, such as, for example, an average filter, a Gaussian filter, and a median filter.

To more effectively find markers included in an image obtained by removing the noise, an image processing method, such as, for example, adaptive binarization and edge enhancement, may be performed. The adaptive binarization may be a method of binarizing a value of each of pixels in an image to be 0 or 1, using a threshold value determined adaptively. The edge enhancement may be a method used to increase a probability of identifying an edge in an image, and may emphasize a local contrast effect with a certain direction.

The measuring apparatus may detect markers each of a circular form from an image in which the form of the markers are processed more clearly through the binarization and the edge enhancement.

The measuring apparatus may arrange the detected markers for each region or range. Here, markers included in range 1 corresponding to the $LWRB_L$ region may be arranged as in 1-8-9-2 based on positions of markers arranged in the input left image 910. In addition, markers included in range 2 corresponding to the $LBRW_L$ region may be arranged as in 1-2-3-4. In addition, markers included in range 3 corresponding to the $LBRB_L$ region may be arranged as in 1-4-5-6 and 1-6-7-8.

The measuring apparatus may separate the regions (e.g., $LWRB_L$, $LBRW_L$, and $LBRB_L$ regions) using center points of the markers arranged for each region.

A dynamic X-talk may be measured as represented by Equation 2 below.

$$X-\text{talk}(\%) = \left( \frac{\frac{\sum_{x,y \in Range2} LBRW_L[x,y]}{\# \text{ of pixel in } range2} - \frac{\sum_{x,y \in Range3} LBRB_L[x,y]}{\# \text{ of pixel in } range3}}{\frac{\sum_{x,y \in Range1} LBRW_L[x,y]}{\# \text{ of pixel in } range1} - \frac{\sum_{x,y \in Range3} LBRB_L[x,y]}{\# \text{ of pixel in } range3}} \right) \times 100$$

[Equation 2]

Equation 1 is applied when the LWRB region, the LBRW region, and the LBRB region are all the same. However, when the three regions are different from each other when a dynamic X-talk is measured, the dynamic X-talk may be measured using an average value of brightness values measured from the regions, as represented by Equation 2 above.

According to an example embodiment, the measuring apparatus may measure a dynamic X-talk as described above, and be used as a reference tool for evaluating the performance when manufacturing a HUD module. In addition, by measuring a dynamic X-talk while changing a distance between eyes of a mask, it is possible to quantitatively evaluate the performance in eye tracking prediction of an eye tracking camera in terms of X-talk.

Figure 10:
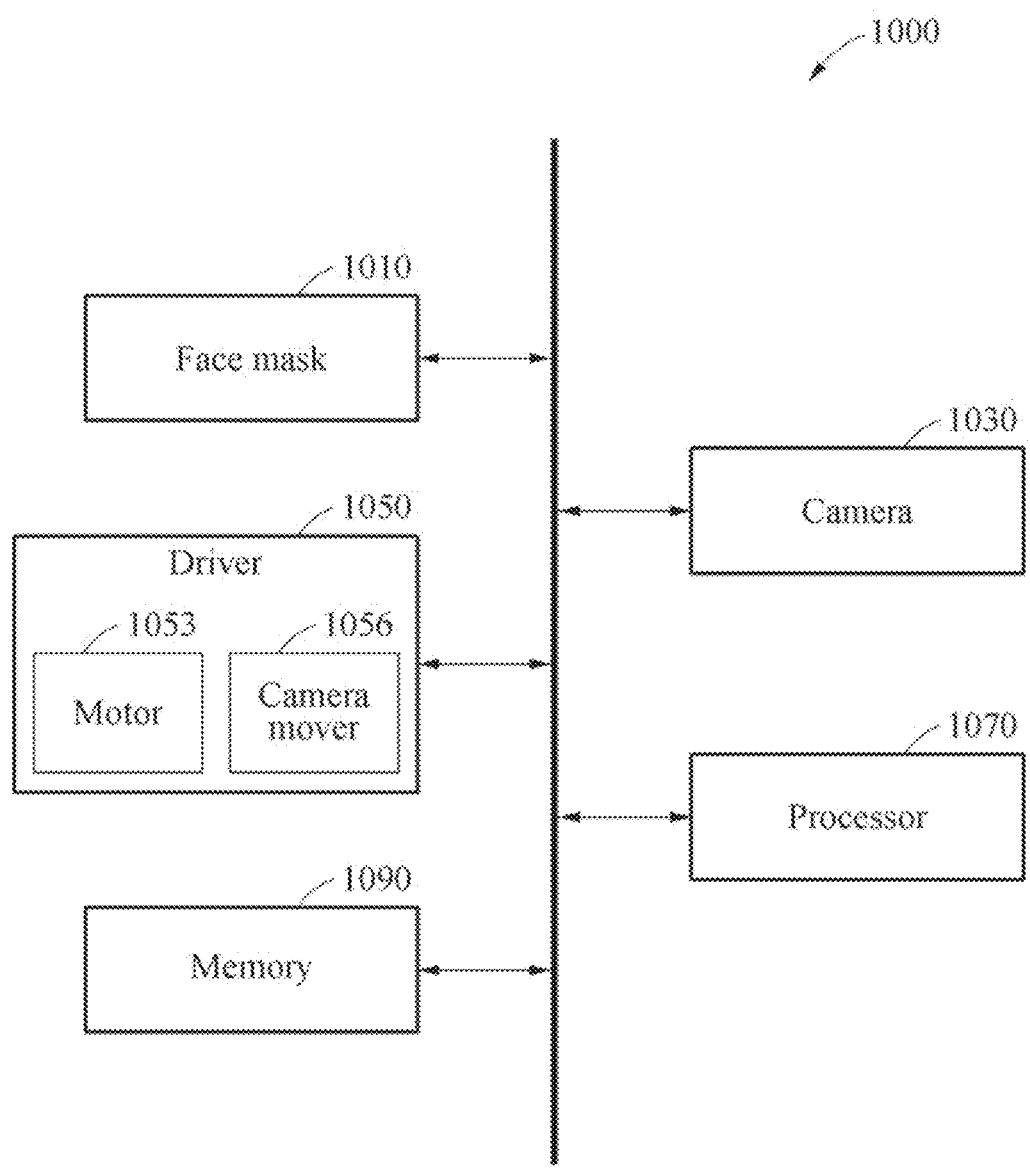
FIG. 10 illustrates an example of an apparatus for measuring a dynamic crosstalk according to an example embodiment.

FIG. 10 illustrates an example of a measuring apparatus for measuring a dynamic X-talk according to an example embodiment. Referring to FIG. 10, a measuring apparatus 1000 configured to measure a dynamic X-talk includes a face mask 1010, a camera 1030, a driver 1050, a processor 1070, and a memory 1090.

The face mask 1010 may be a mask in which respective positions corresponding to both eyes of a user are set, and be arranged in front of the camera 1030.

The camera 1030 may capture a stereo pattern image output through a 3D display from a position of at least one eye of the face mask 1010. The 3D display may be a measurement target from which whether a dynamic X-talk occurs is to be determined or the dynamic X-talk is to be quantified. The 3D display may be, for example, a glassless 3D display, a HUD, or a transparent display of an AR device such as AR eyeglasses. However, examples of the 3D display are not limited thereto. The 3D display may be construed as encompassing various types of displays from which a dynamic X-talk may occur.

The camera 1030 may be an image sensor such as a CMOS sensor or a CCD sensor, or a CMOS camera or a CCD camera. The camera 1030 may be a single camera for one of both eyes of the user, or multiple cameras or a stereo camera for both eyes of the user. The camera 1030 may be arranged at an optimal viewing position of the 3D display. In addition, the settings of the camera 1030 may be adjusted such that saturation does not occur.

The driver 1050 may causes the camera 1030 to have a dynamic movement. The driver 1050 includes a motor 1053 and a camera mover 1056. The motor 1053 may provide the camera 1030 with power for providing the dynamic movement. The camera mover 1056 may move the camera 1030 by the power provided by the motor 1053 in a direction and at a velocity for simulating a movement of the user. The driver 1050 may exert force to the camera 1030 so that the camera 1030 moves in a certain fixed direction and at a certain fixed velocity, or in a variable direction and at a variable velocity.

The processor 1070 may measure a dynamic X-talk occurring by the 3D display by extracting a plurality of regions from an image captured by the camera 1030 to which the dynamic movement provided by the driver 1050 is applied. However, an operation of the processor 1070 is not limited to the foregoing, and the processor 1070 may perform the foregoing operation along with one or more, or all, of the operations described above with reference to FIGS. 1 through 9.

The processor 1070 may be a measuring device embodied by hardware having a circuit of a physical structure to execute desired operations. The desired operations may include, for example, a code or instructions included in a program. The measuring device embodied by hardware may include, for example, a microprocessor, a central processing unit (CPU), a graphics processing unit (GPU), a processor core, a multicore processor, a multiprocessor, an application-specific integrated circuit (ASIC), a field-programmable gate array (FPGA), a neural processing unit (NPU), and the like.

The processor 1070 may execute the program and control the measuring apparatus 1000. The code of the program executed by the processor 1070 may be stored in the memory 1090.

The memory 1090 may store the stereo pattern image captured by the camera 1030 from the position of the at least one of both eyes. In addition, the memory 1090 may store the dynamic X-talk occurring by the 3D display that is measured by the processor 1070. In addition, the memory 1090 may store a quantified value obtained by measuring the dynamic X-talk by the processor 1070.

Figure 11:
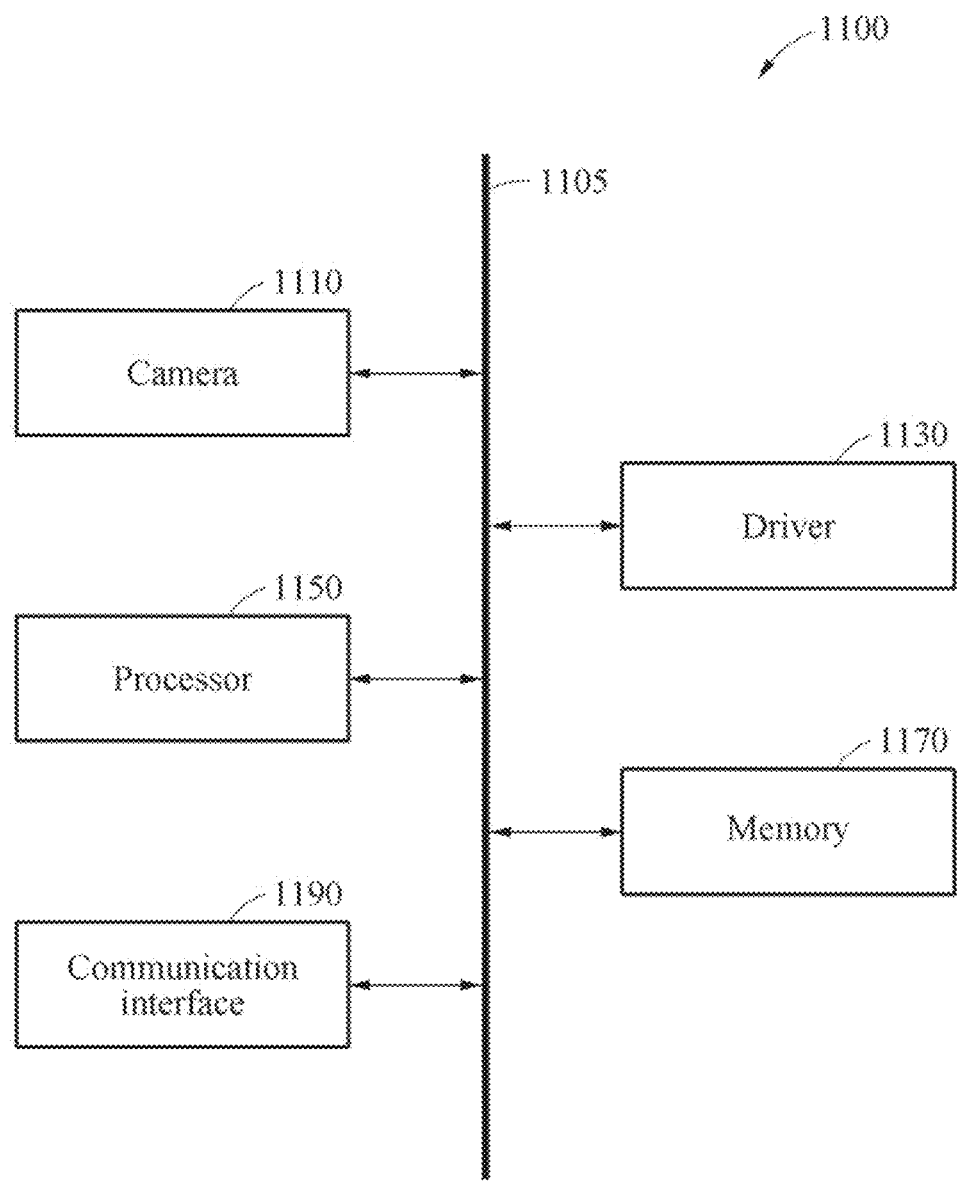
FIG. 11 illustrates an example of a crosstalk testing apparatus according to an example embodiment.

FIG. 11 illustrates an example of an X-talk testing apparatus according to an example embodiment. Referring to FIG. 11, an X-talk testing apparatus 1100 includes at least one camera 1110, a driver 1130, and a processor 1150. The X-talk testing apparatus 1100 may further include a memory 1170 and a communication interface 1190.

The camera 1110, the driver 1130, the processor 1150, the memory 1170, and the communication interface 1190 may be connected to one another through a communication bus 1105.

The camera 1110 may capture a stereo pattern image output through a HUD which is a test target, from a position of at least one of both eyes of a user. The HUD may form a projection plane on which a virtual image is formed through projection to a glass window in front of the user.

The driver 1130 may cause the camera 1110 to have a dynamic movement. Although not illustrated, the driver 1130 may include a motor configured to provide power for providing the dynamic movement to the camera 1110, and a camera mover configured to move the camera 1110 by the power provided by the motor in a direction and at a velocity for simulating a movement of the user.

The processor 1150 may measure a dynamic X-talk occurring by the HUD by extracting a plurality of regions from an image captured by the camera 1110 in the dynamic movement. However, an operation of the processor 1150 is not limited to the foregoing, and the processor 1150 may perform the foregoing operation along with one or more, or all, of the operations described above with reference to FIGS. 1 through 10.

The processor 1150 may be an image processing device embodied by hardware having a circuit of a physical structure to execute desired operations. The desired operations may include, for example, a code or instructions included in a program. X-talk testing apparatus embodied by hardware may include, for example, a microprocessor, a CPU, a GPU, a processor core, a multicore processor, a multiprocessor, an ASIC, a FPGA, an NPU, and the like.

The processor 1150 may execute the program and control the X-talk testing apparatus 1100. The code of the program executed by the processor 1150 may be stored in the memory 1170.

The memory 1170 may store the image captured by the camera 1110. In addition, the memory 1170 may store the dynamic X-talk measured by the processor 1150.

The communication interface 1190 may transmit the dynamic X-talk measured by the processor 1150 to another device, or output the dynamic X-talk to an outside of the X-talk testing apparatus 1100.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of measuring a dynamic crosstalk, the method comprising:
controlling a driver configured to cause a camera to have a dynamic movement;
at either one or both of a left eye position and a right eye position of a user, capturing a stereo pattern image output through a three-dimensional (3D) display, by the camera while the camera is in the dynamic movement; and measuring the dynamic crosstalk occurring by the 3D display by calculating an average of the dynamic crosstalk based on a velocity of the dynamic movement of the camera.

2. The method of claim 1, wherein the measuring of the dynamic crosstalk comprises:
  detecting a plurality of markers that indicate a plurality of regions of the captured stereo pattern image corresponding to a maximum brightness and a minimum brightness in the captured stereo pattern image;
  extracting the plurality of regions based on the plurality of markers; and
  measuring the dynamic crosstalk based on a brightness value of pixels measured from each of the plurality of regions.

3. The method of claim 1, wherein, when the camera captures, as the stereo pattern image, a left image to be provided to a left eye of the user and a right image to be provided to a right eye of the user, the measuring of the dynamic crosstalk comprises:
  detecting a plurality of markers that divides each of the left image and the right image into a plurality of regions;
  extracting the plurality of regions based on the plurality of markers; and
  measuring the dynamic crosstalk based on a statistical value of a brightness value of pixels measured from each of the plurality of regions.

4. The method of claim 1, wherein the controlling of the driver comprises:
  controlling the driver to cause the camera to move at a constant velocity and in a variable direction.

5. A method of measuring a dynamic crosstalk, the method comprising:
  at either one or both of a left eye position and a right eye position of a user, capturing a stereo pattern image output through a three-dimensional (3D) display, by a camera while the camera is in a dynamic movement;
  controlling a driver configured to cause the camera to have the dynamic movement by adjusting a pupillary distance of a face mask arranged in a direction facing the 3D display; and
  measuring the dynamic crosstalk occurring by the 3D display based on the stereo pattern image captured by the camera.

6. A method of measuring a dynamic crosstalk, the method comprising:
  at either one or both of a left eye position and a right eye position of a user, capturing a stereo pattern image output through a three-dimensional (3D) display, by a camera while the camera is in a dynamic movement;
  controlling a driver configured to cause a position of the camera to correspond to a position of at least one eye in a face mask arranged in a direction facing the 3D display;
  measuring the dynamic crosstalk occurring by the 3D display based on the stereo pattern image captured by the camera.

7. The method of claim 1, further comprising:
  capturing, at either one or both of the left eye position and the right eye position of the user, the stereo pattern image based on a pupillary distance of a face mask arranged in a direction facing the 3D display.

8. The method of claim 7, wherein the capturing of the stereo pattern image comprises:
  capturing the stereo pattern image in an interval while the camera moves at a constant velocity, and the measuring of the dynamic crosstalk comprises:
  measuring the dynamic crosstalk by analyzing the stereo pattern image captured in the interval while the camera moves at the constant velocity.

9. The method of claim 1, further comprising:
  compensating for the dynamic crosstalk based on a position of the camera moved by the dynamic movement.

10. The method of claim 1, wherein the stereo pattern image captured by the camera comprises a first region corresponding to a first pattern image for measuring a maximum brightness, a second region corresponding to a second pattern image for measuring a minimum brightness, and a third region corresponding to a third pattern image for measuring a brightness offset of the 3D display.

11. The method of claim 1, wherein the 3D display is configured to generate the stereo pattern image that matches the left eye position and the right eye position of the user, based on parameters of an optical layer obtained through 3D calibration.

12. The method of claim 1, wherein the 3D display comprises:
  an eye tracker or a sensor configured to detect the left eye position and the right eye position of the user,
  wherein the 3D display is configured to apply rendering to positions of the stereo pattern image corresponding to the left eye position and the right eye position of the user.

13. The method of claim 1, wherein the 3D display comprises at least one of a head-up display (HUD), a 3D digital information display (DID), a navigation device, a 3D mobile device, a smartphone, a smart television (TV), a smart vehicle, an Internet of things (IoT) device, a medical device, or a measurement device.

14. The method of claim 1, wherein the stereo pattern image comprises a two-dimensional (2D) pattern that represents a pattern of a single color identically to a left eye and a right eye of the user, and a 3D pattern that represents patterns of contrasting colors inversely to the left eye and the right eye of the user.

15. The method of claim 1, wherein the stereo pattern image comprises a 2D pattern that represents patterns of contrasting colors identically to a left eye and a right eye of the user, and a 3D pattern that represents the patterns of the contrasting colors inversely to the left eye and the right eye of the user.

16. A non-transitory computer-readable storage medium storing instructions that are executable by a processor to perform the method of claim 1.

17. An apparatus for measuring a dynamic crosstalk, the apparatus comprising:
  a face mask in which a left eye position and a right eye position of the face mask correspond to a left eye position and a right eye position of a user, respectively;
  a camera configured to capture, at either one or both of the left eye position and the right eye position in the face mask, a stereo pattern image that is output through a three-dimensional (3D) display;
  a driver configured to cause the camera to have a dynamic movement; and
  a processor configured to measure the dynamic crosstalk occurring by the 3D display based on the stereo pattern captured by the camera while the camera is in the dynamic movement.

18. The apparatus of claim 17, wherein the processor is further configured to:
  detect a plurality of markers that indicate a plurality of regions of the captured stereo pattern image corresponding to a maximum brightness and a minimum brightness in the captured stereo pattern image;
extract the plurality of regions based on the plurality of markers; and
measure the dynamic crosstalk based on a brightness value of pixels measured from each of the plurality of regions.

19. The apparatus of claim 17, wherein, when the camera captures, as the stereo pattern image, a left image to be provided to a left eye of the user and a right image to be provided to a right eye of the user, the processor is further configured to:
detect a plurality of markers that divides each of the left image and the right image into a plurality of regions;
extract the plurality of regions based on the plurality of markers; and
measure the dynamic crosstalk based on a statistical value of a brightness value of pixels measured from each of the plurality of regions.

20. The apparatus of claim 17, wherein the processor is further configured to:
compensate for the dynamic crosstalk based on a position of the camera moved by the dynamic movement.

21. The apparatus of claim 17, wherein the captured stereo pattern image comprises a first region corresponding to a first pattern image for measuring a maximum brightness, a second region corresponding to a second pattern image for measuring a minimum brightness, and a third region corresponding to a third pattern image for measuring a brightness offset of the 3D display.

22. The apparatus of claim 17, wherein the driver comprises:
a motor configured to provide power for causing the camera to have the dynamic movement; and
a camera mover configured to move the camera by the power in a direction and at a velocity to simulate a movement of the user.

23. The apparatus of claim 22, wherein the processor is further configured to:
control the camera mover to move the camera at the velocity having a constant value.

24. The apparatus of claim 22, wherein the processor is further configured to:
control the camera mover to change at least one of the direction or the velocity of the camera.

25. The apparatus of claim 17, wherein a distance between the left eye position and the right eye position in the face mask is adjustable,
wherein the processor is further configured to:
measure the dynamic crosstalk by extracting a plurality of regions from the captured stereo pattern image based on the dynamic movement and the distance between the left eye position and the right eye position that is adjusted in the face mask.

26. The apparatus of claim 17, wherein the 3D display is configured to:
generate the stereo pattern image that match the left eye position and the right eye position of the user, based on parameters of an optical layer obtained through 3D calibration.

27. The apparatus of claim 17, further comprising:
an eye tracker or a sensor configured to detect the left eye position and the right eye position of the user,
wherein the 3D display is configured to:
apply rendering positions of the stereo pattern image that correspond to the left eye position and the right eye position of the user that are detected using the eye tracker or the sensor.

28. The apparatus of claim 17, wherein the stereo pattern image comprises a two-dimensional (2D) pattern that represents a pattern of a single color identically to a left eye and a right eye of the user, and a 3D pattern that represents patterns of contrasting colors inversely to the left eye and the right eye of the user.

29. The apparatus of claim 17, wherein the stereo pattern image comprises a 2D pattern that represents patterns of contrasting colors identically to a left eye and a right eye of the user, and a 3D pattern that represents the patterns of the contrasting colors inversely to the left eye and the right eye of the user.

30. The apparatus of claim 17, wherein the 3D display comprises at least one of a head-up display (HUD), a 3D digital information display (DID), a navigation device, a 3D mobile device, a smartphone, a smart television (TV), a smart vehicle, an Internet of things (IoT) device, a medical device, or a measurement device.

31. A crosstalk testing apparatus, comprising:
at least one camera configured to capture, at either one or both of a left eye position and a right eye position of a user, a stereo pattern image output through a head-up display (HUD);
a driver configured to cause the camera to move to have a dynamic movement; and
a processor configured to measure a dynamic crosstalk occurring by the HUD by calculating an average of the dynamic crosstalk based on a velocity of the dynamic movement of the camera.

* * * * *